March 21, 1961     E. WILDHABER     2,975,681
METHOD AND APPARATUS FOR CUTTING TOOTHED ARTICLES
Filed May 23, 1955     7 Sheets-Sheet 1
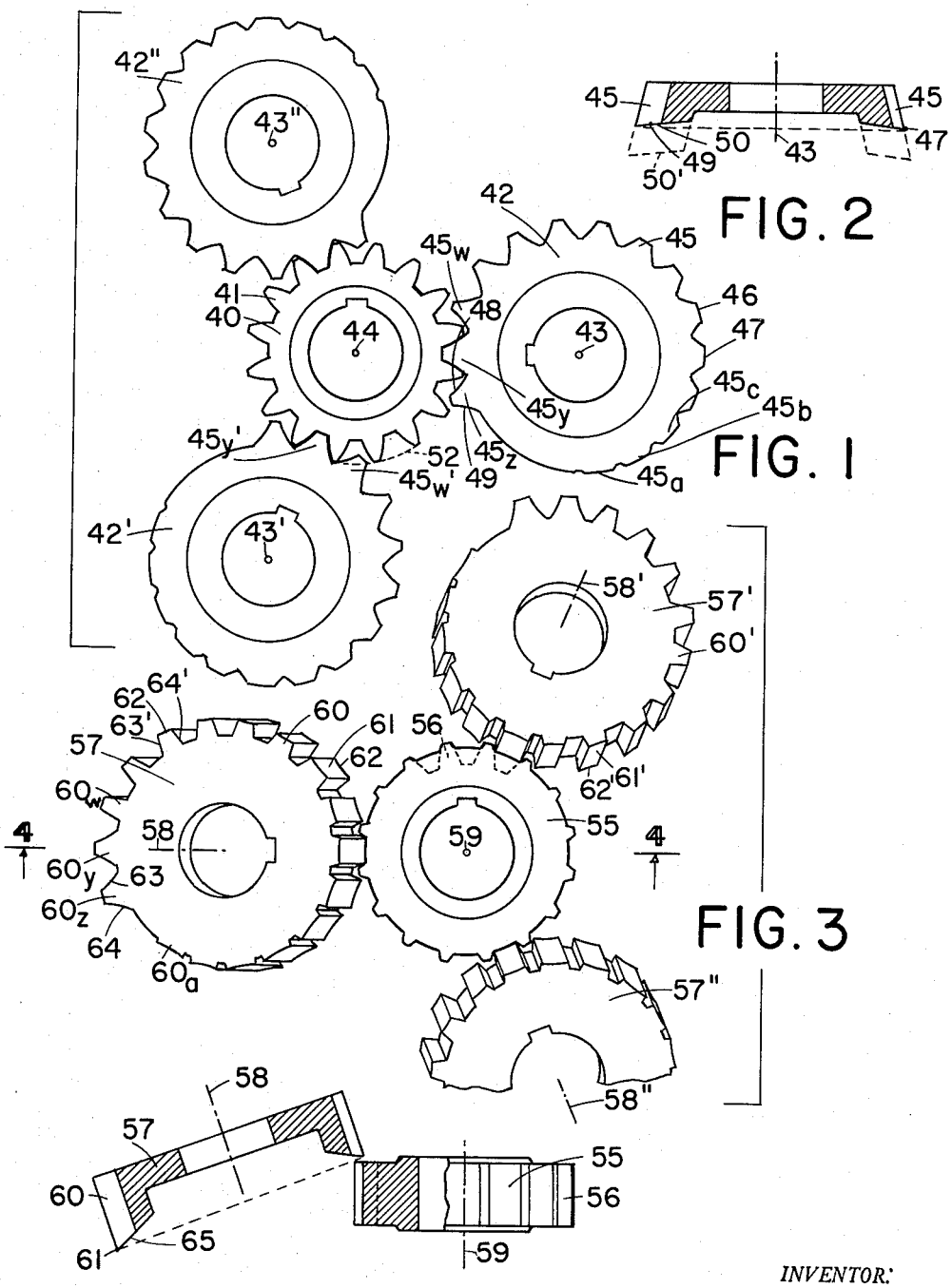
INVENTOR:
E. WILDHABER
BY
Attorney March 21, 1961  E. WILDHABER  2,975,681
METHOD AND APPARATUS FOR CUTTING TOOTHED ARTICLES
Filed May 23, 1955  7 Sheets-Sheet 2
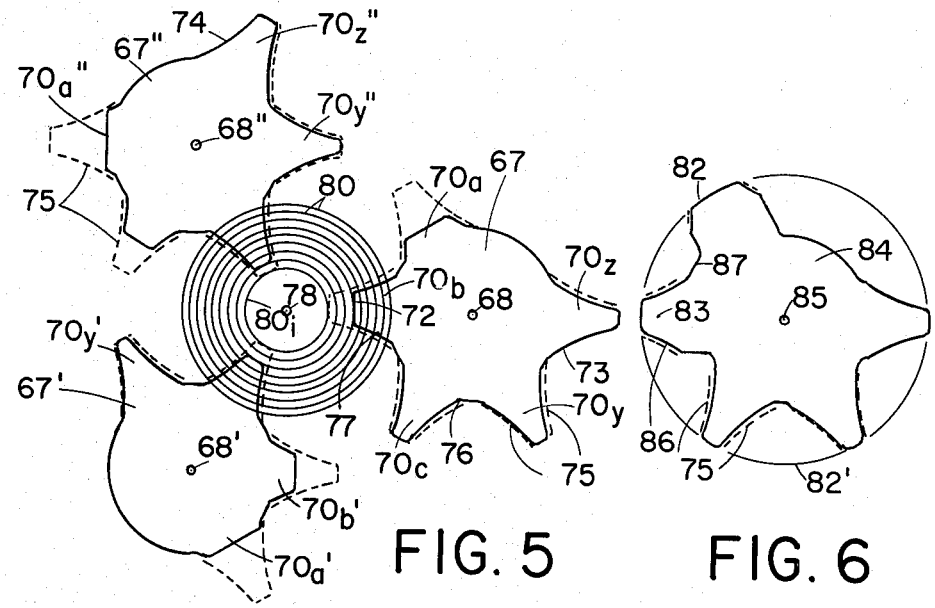
FIG. 5  FIG. 6
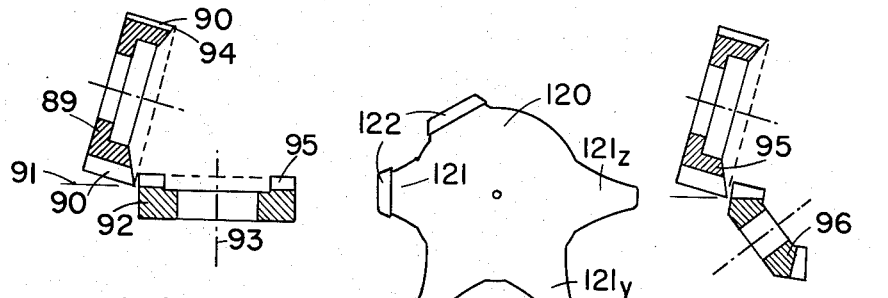
FIG. 7  FIG. 11  FIG. 8
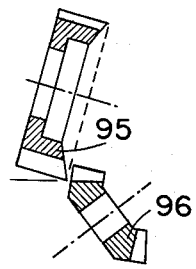
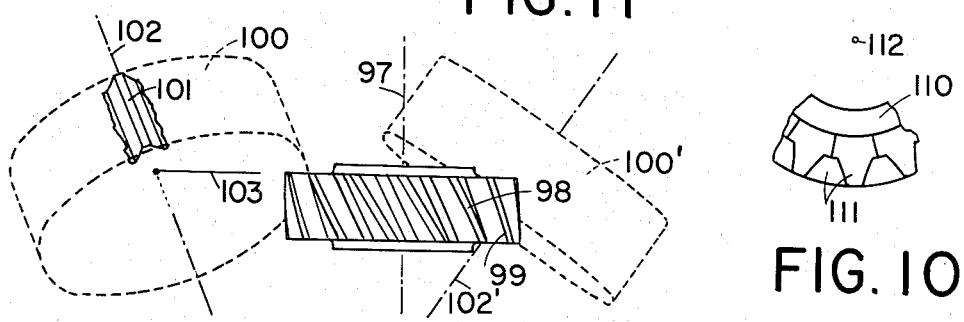
FIG. 9
FIG. 10
INVENTOR:
E. WILDHABER
BY
Attorney March 21, 1961  E. WILDHABER  2,975,681
METHOD AND APPARATUS FOR CUTTING TOOTHED ARTICLES
Filed May 23, 1955  7 Sheets-Sheet 3
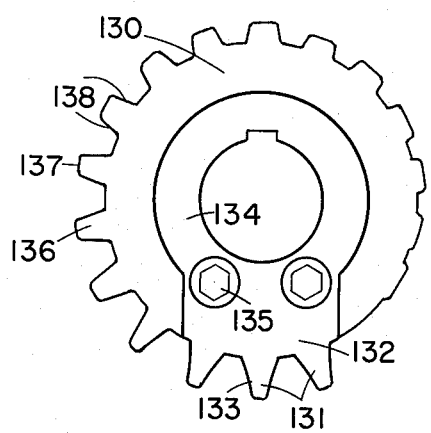
FIG. 12
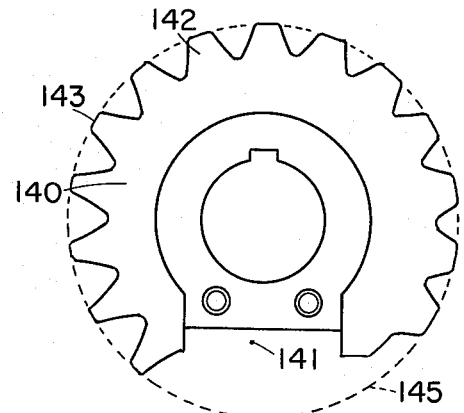
FIG. 13
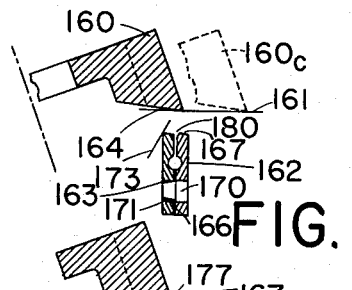
FIG. 15
FIG. 16
FIG. 17
FIG. 18
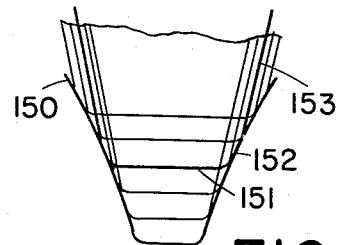
FIG. 14
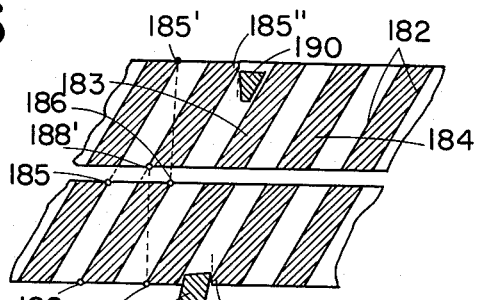
FIG. 19
INVENTOR:
E. WILDHABER
BY
Attorney March 21, 1961     E. WILDHABER     2,975,681
METHOD AND APPARATUS FOR CUTTING TOOTHED ARTICLES
Filed May 23, 1955                         7 Sheets-Sheet 4

INVENTOR:
E. WILDHABER
BY
Attorney

March 21, 1961 E. WILDHABER 2,975,681
METHOD AND APPARATUS FOR CUTTING TOOTHED ARTICLES
Filed May 23, 1955 7 Sheets-Sheet 5

INVENTOR:
E. WILDHABER
BY
Attorney

March 21, 1961     E. WILDHABER     2,975,681
METHOD AND APPARATUS FOR CUTTING TOOTHED ARTICLES
Filed May 23, 1955     7 Sheets-Sheet 6
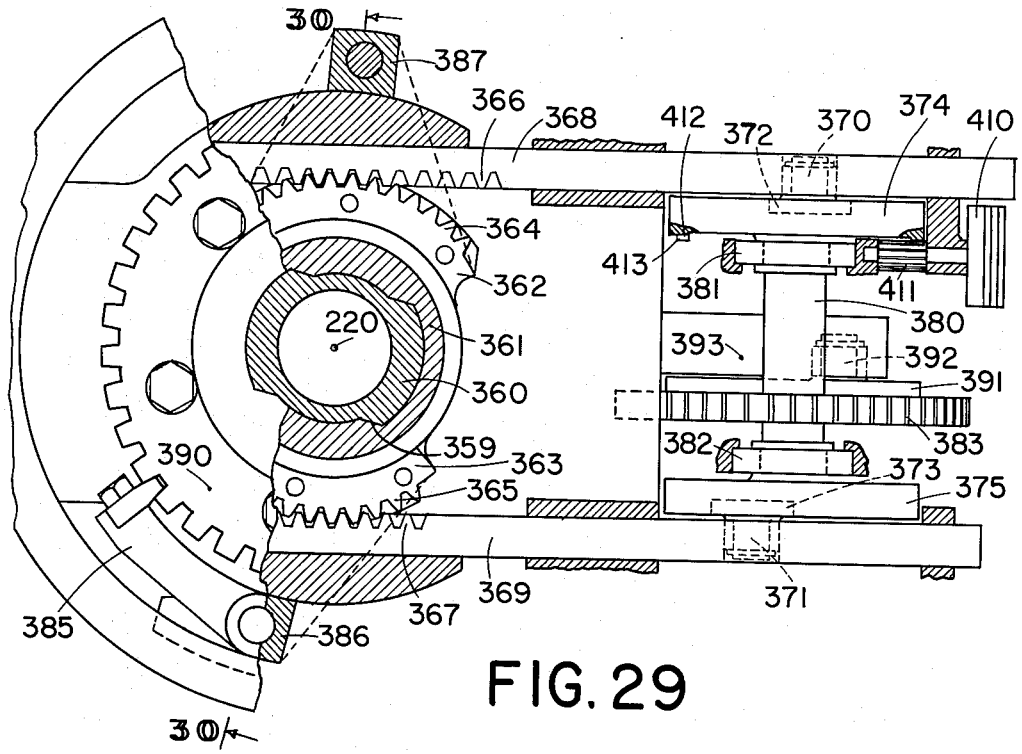
FIG. 29
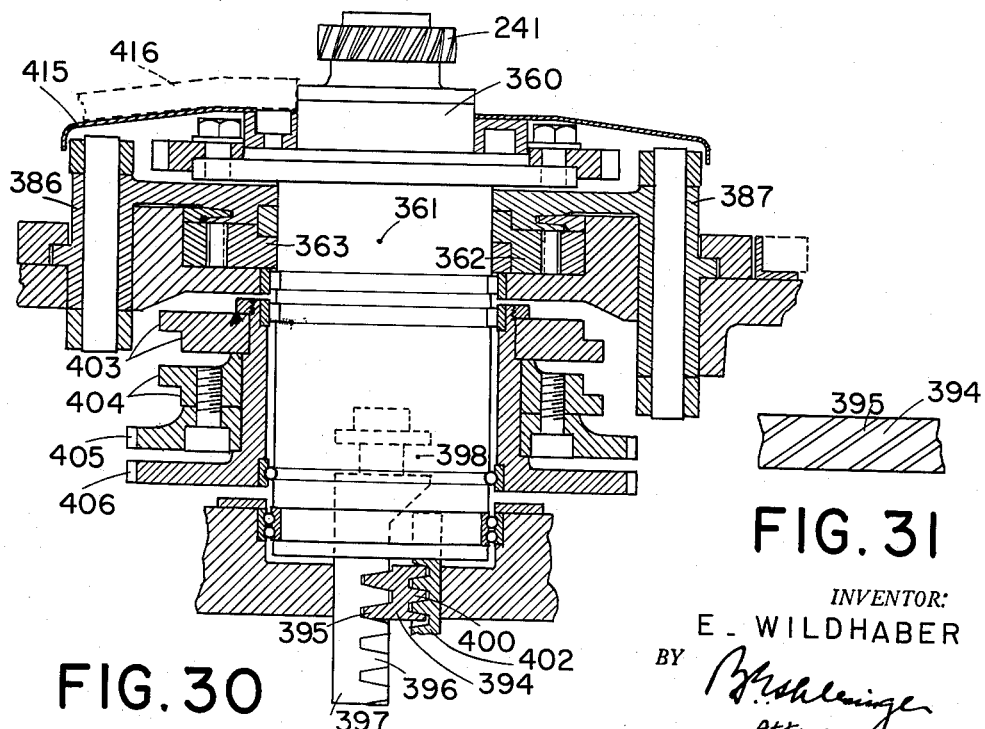
FIG. 30
FIG. 31
INVENTOR:
E. WILDHABER
BY
Attorney March 21, 1961 E. WILDHABER 2,975,681
METHOD AND APPARATUS FOR CUTTING TOOTHED ARTICLES
Filed May 23, 1955 7 Sheets-Sheet 7

INVENTOR:
E. WILDHABER
BY
Attorney

United States Patent Office 2,975,681
Patented Mar. 21, 1961

2,975,681
METHOD AND APPARATUS FOR CUTTING TOOTHED ARTICLES
Ernest Wildhaber, 124 Summit Drive, Brighton 20, N.Y.
Filed May 23, 1955, Ser. No. 510,468
21 Claims. (Cl. 90—10)

The present invention relates to a method, to tools, and to apparatus for cutting teeth on gears, including worms, on splined shafts, on toothed couplings, and on other parts. More particularly, the invention relates to a method of and to tools and apparatus for cutting spur and helical gears.

One object of the present invention is to cut teeth efficiently and with a high degree of accuracy.

Another object of the invention is to provide a method and means for successively roughing and finish-cutting gears and other toothed parts in a single set-up and operation.

Another object of the invention is to provide a method of, and a tool and machine for finishing toothed articles from the solid in which an efficient roughing cut is followed by a finishing cut or cuts with a tool having formed cutting edges so as to produce a fine finishing skin or shaving cut.

Another object of the invention is to provide a method and means for reducing cutting time and tool cost in cutting toothed articles by producing the simplest form of chips in the roughing operation.

A related object of the invention is to provide a method and means for cutting toothed objects in which chips are produced, which extend along the whole length of a tooth, whether it be a straight tooth or a helical tooth, and which extend over most of the width of a tooth space, and where the initial chips are the widest.

Another object of the invention is to provide a method and means of the character described in which ease-off may be applied at the ends of the teeth.

Still another object of the invention is to provide a method and means of the character described which also permits burring or chamfering the teeth at their ends in the same operation.

Another object of the invention is to provide a simple tool or cutter for carrying out the process of the invention, and one which will cut exactly the same shape during its whole life.

Another object of the invention is to provide a cutting process for cutting gears and the like in which a plurality of cutters are employed that are spaced around the workpiece, and in which successive cuts are taken in a tooth space by different cutters, and in which the cutters take, each, the same share of the work.

Another object of the invention is to provide a process and means of the character described, in which the gears, or other toothed articles, are cut from the solid.

Still another object of the invention is to provide a process and means for cutting gears, or other toothed articles, from the solid without depthwise feed of the cutters relative to the work.

Other objects of the invention will be apparent hereinafter from the specification and from the recital of the appended claims.

The various objects of the invention are accomplished by cutting gears or other toothed objects from the solid with cutters, each of which has a plurality of cutting teeth arranged about its axis that have gradually increasing depth and that have a width at their tips which decreases with increasing depth. The cutting teeth, which cut first into solid metal, are widest; and the teeth become gradually narrower, depending on the depth at which they cut. The width at the tips of the cutting teeth is approximately equal to the width of the tooth space of the workpiece at the depth at which the cutting teeth cut; and this is also the width of the chips the cutting teeth produce.

In one embodiment of the invention, the tips of the majority of the cutting teeth lie on a spiral and have different distances form the axis of the cutter. When cutters having such cutting teeth are used, the cutters cut without depthwise feed into the work. In another embodiment of the invention, where feed motion is employed, the tips of the teeth have the same distance from the cutter axis, but they have a varying width, and the cutting teeth also have a gradually increasing depth.

When a plurality of cutters is used to cut cylindrical gears, or cylindrical toothed parts, the work is preferably reciprocated. To cut straight teeth, it is reciprocated in the direction of the work axis. To cut helical teeth, a helical reciprocation along and about the work axis is effected. That is, in addition to the reciprocation in the direction of the work axis there is also a corresponding turning motion about the work axis. Ordinarily, each cutter cuts with but a single tooth at a time. After this cutting tooth has cut its last chip, the cutter is indexed to place another cutting tooth in cutting position.

In accordance with the invention, means are provided to index a cutter very rapidly, namely, during a return stroke between successive cutting strokes. With this provision, there is no interruption in the cutting strokes. This results not only in time saving, but it also simplifies the design.

In accordance with my invention, also, the work is turned or indexed after each cutting stroke. To do that very rapidly, and avoid wear of the indexing mechanism, several steps are taken. First, an inertia member is disposed adjacent the index mechanism. This inertia member is preferably geared at a predetermined varying ratio to the index operating member in such a way that it supplies the varying kinetic energy of the parts moving at rapidly changing rates. It delivers a portion of its own kinetic energy to the parts when they need it, and takes it back again when they lose it. In this way, sudden torque fluctuations are avoided in the timing train, and smooth operation is made possible even at high speeds. Inertia members of this kind are disclosed specifically in my copending application, Serial No. 494,076, filed March 14, 1955.

A second step preferably taken consists in the provision for dynamic mass balance of the inertia moments occurring in intermittent indexing. This mass balance is accomplished by means of an oscillatory member described in my pending application Serial No. 500,933, filed April 12, 1955, now Patent No. 2,934,977, issued May 3, 1960.

A third and important step is an improvement in the index plates and locking dogs or pawls, to enable the plates to have surface contact, or near surface contact, with a locking member or pawl, not only in the full depth position of engagement, but also in positions near full depth position. The shape of the notch of the index plate and of the locking part is determined from the motion of this part, to give the said desired characteristic. In this way, the locking mechanism is made to stand up without undue wear despite severe service. This feature has been described at length in my copending application Serial No. 500,933, above mentioned.

On the return strokes, between cutting strokes, a cutter is completely clear of the work, and of the outside surface of the work. In accordance with one phase of my invention a cutter is honed during its return strokes. Moreover, it is honed from the outside inwardly, as in honing by hand, to maintain its cutting edges keen. With this arrangement a cleaner and more exactly controlled cut is attained together with increased tool life.

In the drawings:

Fig. 1 is a view illustrating diagrammatically a process for cutting gears according to one embodiment of the invention, and the cutters employed therein, a gear being shown being cut by a plurality of cutters in a reciprocating process without depthwise feed;

Fig. 2 is an axial section of one of the cutters used in this embodiment of the invention;

Fig. 3 is a view, similar to Fig. 1, showing a gear blank in process of being cut by a plurality of cutters of modified and preferred form;

Fig. 4 is a part side elevation, part axial section taken on the line 4—4 of Fig. 3, looking in the direction of the arrows;

Fig. 5 is a view showing exaggeratedly the cutting of a gear blank according to the invention with a set of cutters operating without feed motion;

Fig. 6 is an end view of a cutter similar to the cutters of Fig. 5, but designed for use with depth feed;

Fig. 7 is an axial section through a workpiece and a cutter, illustrating the application of the present invention to cutting toothed face couplings or face gears;

Fig. 8 is an axial section, similar to Fig. 7, showing an application of the invention to the cutting of bevel gears;

Fig. 9 is a side view illustrating a preferred way of cutting a helical gear according to the invention with cutters having straight teeth;

Fig. 10 is a partial end view of another form of cutter for cutting helical teeth, a cutter with helical cutting teeth and formed cutting edges;

Fig. 11 is an end view of a cutter, similar to the cutter shown in Fig. 5, but having cutting teeth tipped with a harder cutting material such as tungsten carbide;

Fig. 12 is an end view of a cutter constructed according to a further embodiment of the invention, and in which the finish cutting edges are provided on an insert;

Fig. 13 is an end view similar to Fig. 12, but showing only the roughing teeth of the cutter, and showing, moreover, a cutter designed for use with depth feed;

Fig. 14 is a diagram showing the superimposed profiles of the roughing teeth of one form of cutter constructed according to the present invention;

Figure 20:
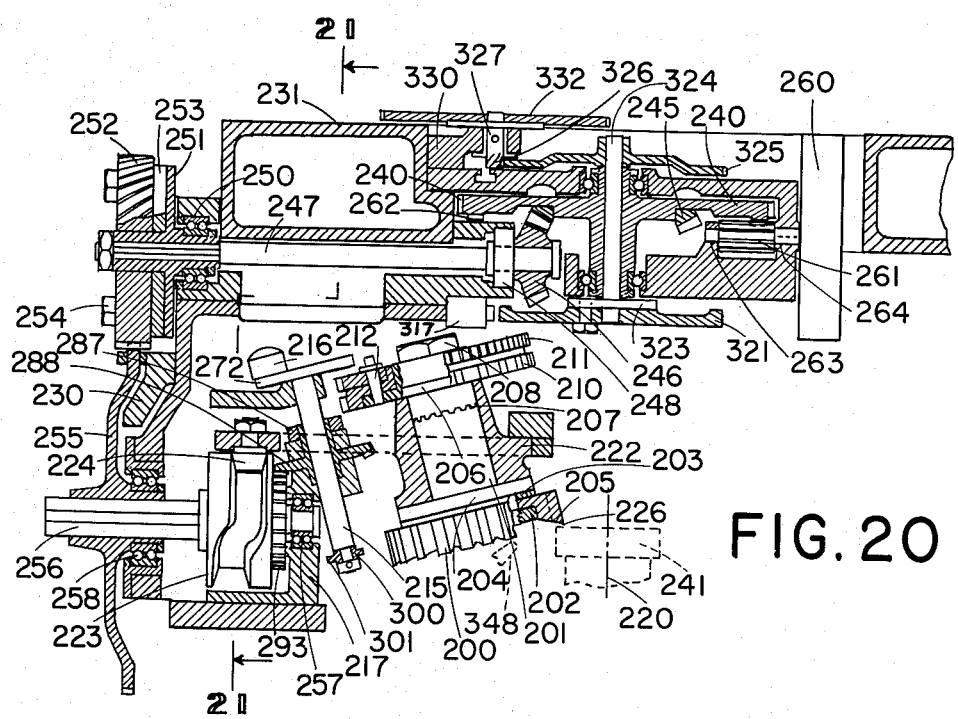
Figure 21:
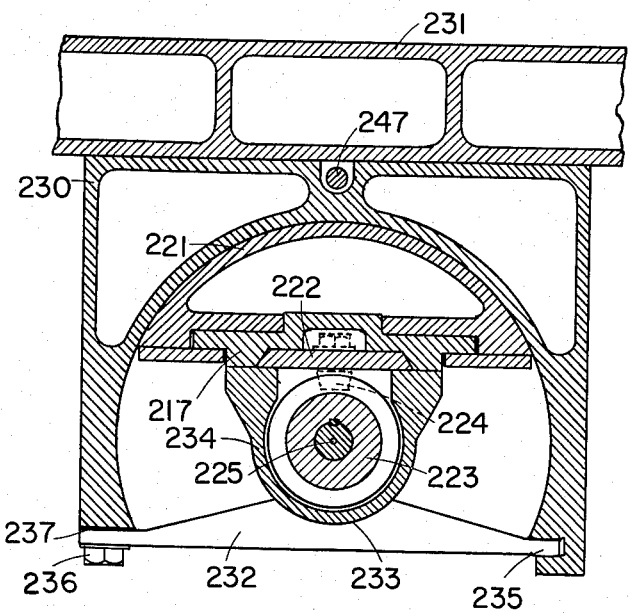
Figure 22:
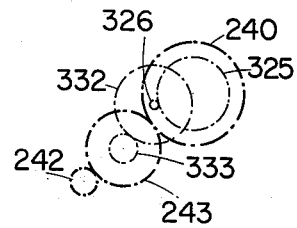
Figure 23:
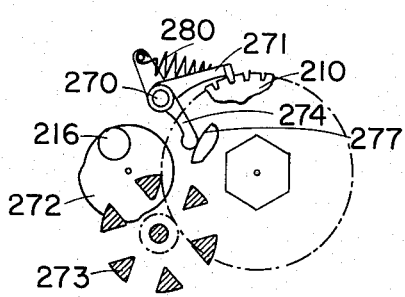
Figure 24:
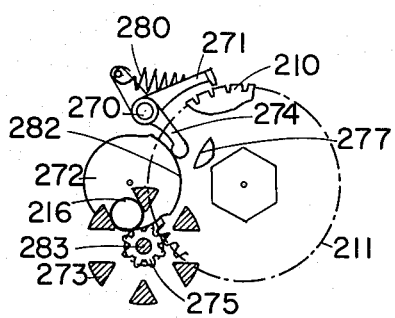
Figure 26:
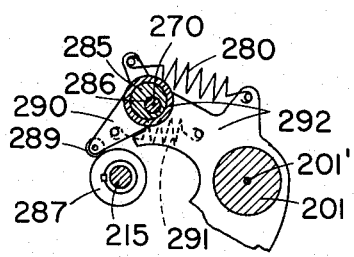
Figure 25:
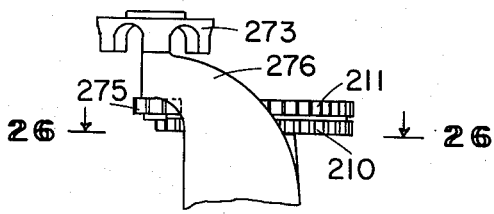
Figure 27:
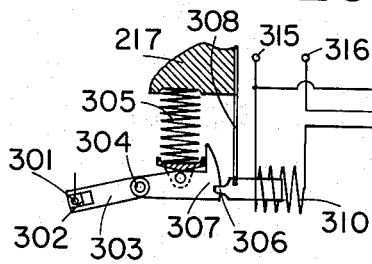
Figure 28:
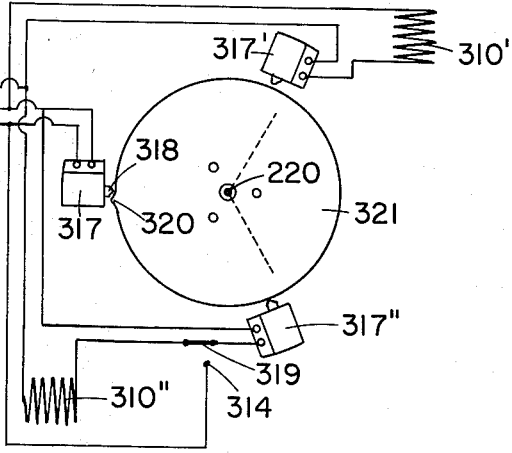
Figures 32, 33:
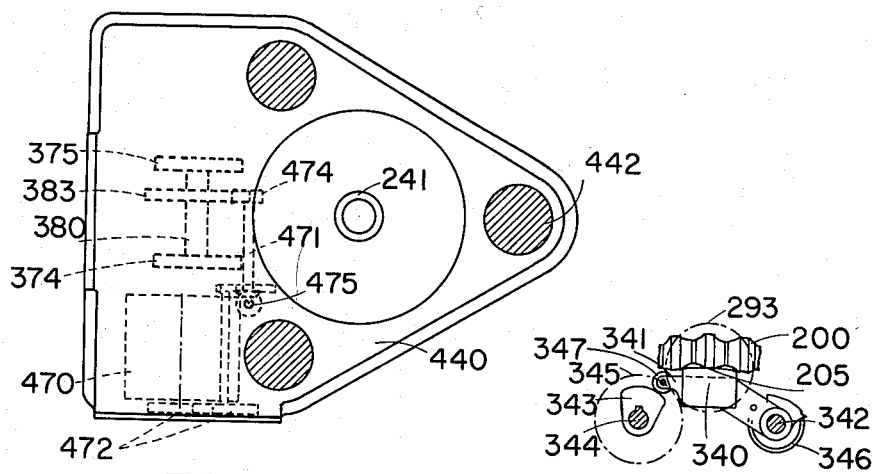
Figure 34:
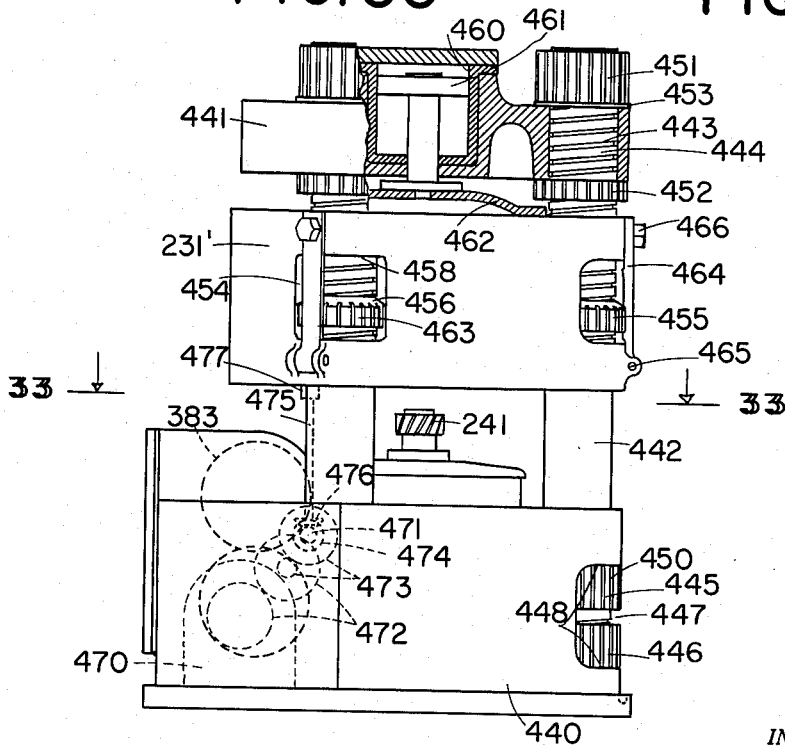

Figs. 15 to 18 inclusive illustrate a cutter and a honing tool in various positions of the honing pass during the return stroke of the tool;

Fig. 19 is a more or less diagrammatic view illustrating a way of chamfering helical gear teeth during the cutting process, the gear being shown in its two end positions of the helical stroke and in a section extending along the pitch cylinder, this section being shown in a development to a plane;

Fig. 20 is a fragmentary section of a machine constructed according to one embodiment of this invention, the section being through the cutter supporting structure and its drive;

Fig. 21 is a section along the line 21—21 of Fig. 20, looking in the direction of the arrows;

Fig. 22 is a diagram further illustrating the relation of the gears in the gear drive shown in Fig. 20;

Figs. 23 and 24 are each a cross-section through the Geneva wheel of the index mechanism of this machine, and showing other parts of the index, in end elevation, the view being taken looking downwardly in Fig. 20 in the direction of the cutter axis, Fig. 23 showing the positions of the parts during cutting, and Fig. 24 showing positions during indexing;

Fig. 25 is a front view, corresponding to Fig. 24, of parts of the index mechanism;

Fig. 26 is a section taken along the line 26—26 of Fig. 25 looking in the direction of the arrows;

Fig. 27 is a diagrammatic view showing how the release of the catch, which initiates indexing of a cutter, is timed and controlled;

Fig. 28 is a development of a section taken along the cylindrical surface described by the axis of the roller which engages the Geneva wheel, and illustrating the control of the intermittent axial motion of the shaft carrying the roller;

Fig. 29 is partly a section through the work support of the machine perpendicular to the work axis, and partly a view in the direction of the work axis;

Fig. 30 is an axial section taken on the line 30—30 of Fig. 29 looking in the direction of the arrows;

Fig. 31 is a side view of one of the racks shown in section in Fig. 30;

Fig. 32 is a fragmentary view taken in the direction of the clapping motion of a cutter and showing the honing arrangement;

Fig. 33 is a part plan view and part transverse section, and Fig. 34 a corresponding front elevation of a machine constructed according to one embodiment of the present invention.

Referring now to the drawings by numerals of reference, 40 (Fig. 1) denotes a nearly completed spur gear blank having longitudinally straight teeth 41. In the embodiment of the invention shown in Fig. 1, this blank is cut by a plurality of cutters 42, 42′, 42″ disposed around the blank and in simultaneous cutting engagement therewith. The cutters, whose axes are denoted at 43, 43′, 43″, respectively, are so spaced from one another about the axis 44 of the gear blank that each is located in the central plane of a tooth space of the blank. They are as nearly evenly spaced about the blank axis as the tooth number of the gear permits. The three cutters shown would be equally spaced about the axis of the blank at 120° intervals were the tooth number of the blank exactly divisible by three.

The three cutters are of the same general character; and an axial section of one is shown in Fig. 2. Each cutter has a plurality of cutting teeth 45 of progressively increasing depth, and of a width at their tips 46 which decreases with increasing depth of cut. Thus, the depth of successive cutting teeth of the cutter 45 increases from the cutting tooth 45a to the cutting tooth 45b, to the cutting tooth 45c, and so on, until full cutting depth is reached at cutting tooth 45w. The last cutting teeth 45y and 45z are intended for finishing and both have equal and full depth, or nearly full depth. As the depth increases from tooth 45a to tooth 45w, the width of the top lands of the teeth decreases. The top lands 46 in this embodiment of the invention have progressively increasing distance from the respective cutter axes 43, 43′, 43″; and the top lands of the cutting teeth of each cutter therefore lie on a spiral, having its center on the respective cutter axis, the spiral being the connecting line of the mid-point of the ends or top lands of the teeth.

Top cutting edges 47 and side cutting edges 48 and 49 are formed on each of the cutting teeth of the cutters by cutting faces 50 (Fig. 2). In the instance illustrated, the cutting faces of each cutter are portions of a single conical surface coaxial with the cutter. It is a slightly internal cone as shown in Fig. 2. The cutting teeth are relieved back of the cutting edges to provide cutting clearance. The cutting teeth are sharpened by regrinding their cutting faces 50. The cutter is shown in full lines in Fig. 2 after it has been sharpened considerably. 50′ designates the cutting face of a new cutter.

The side cutting edges 48 and 49 of the cutting teeth of each cutter are concavely curved edges adapted to apply a form cut to the side tooth surfaces of the blank.

The finish cutting teeth 45y, 45z of each cutter are intended for form cutting, that is, for taking a skin cut off the tooth sides. The cutting tooth 45y is dimensioned to leave a slight amount of stock for the last tooth 45z to take off.

The roughing teeth 45a to 45w of each cutter cut with their tip cutting edges 47. Except for the slight finishing allowance, the roughing teeth have cutting edges which match the tooth spaces of the gear blank as far down as the cutting edges cut. The roughing teeth can then be considered identical except for depth, and equally positioned with respect to the cutter axis 43. Their root surface is a circle concentric with the cutter axis 43, but their top lands are arranged in a spiral about that axis.

The angular spacing of the cutting teeth is as small as permissible without interference, and small enough that a cutting tooth, such as tooth 45w', which is adjacent to the cutting tooth 45y' of cutter 42' in cutting position, reaches through the outside circle 52 of the gear blank 40. This feature applies to all forms of cutters illustrated in the drawings.

When a plurality of cutters operate on the same blank, reciprocation is imparted preferably to the blank to effect the cutting motion. The reciprocation is in the direction of the axis 44 of the blank in the case of spur gears. The cutters are positioned to cut first with their low and wide teeth, and are indexed from time to time as needed. Indexing is during the return stroke of the gear blank without slow-down or stoppage. Very simple chips result, produced by the end cutting edges 46. The stock is removed with maximum efficiency.

At the ends of each cutting stroke, the cutters are withdrawn in a direction radial of the gear blank to clear the blank, even the outside surface 52 of the blank, completely during the return stroke. The cutters are advanced again to cutting positions at the end of the return stroke. The gear blank is preferably indexed during each return stroke of the cutters.

The following advantages are secured by the use of a plurality of cutters operating simultaneously on the same blank:

(1) The operation is faster at no sacrifice of quality, for the last finishing cut on each of the two sides of a tooth is applied by a single cutter. The same cutting edge finishes one side of all the teeth.

(2) The radial motion of the cutters, that is, the radial clapping and return motion, is dynamically mass-balanced as the cutters move in different directions.

(3) Feed motion can be eliminated entirely; and this can be done without requiring cutters of excessive size. In other words, the cutter axes stay in the same position during the cut throughout the entire operation. This simplifies the machine design and adds to its rigidity. The depth feed, in effect, is built into the cutters.

In one embodiment of the invention, all the cutters are identically positioned with respect to axis 44 of the gear blank. This requires the cutters to be slightly different, to achieve equal distribution of their work. In another embodiment, the cutters have identical roughing teeth but slightly different positions. In both cases, the cutters are indexed successively as will further be described hereinafter.

Still further:

(4) This process permits finish cutting of a gear in a single operation. The cutters take off a skin cut or shaving cut at the end so that a subsequent shaving operation is unnecessary.

Fig. 3 shows essentially the same operation as Fig. 1 except for the use of modified cutters. The gear blank 55, which is to be provided with straight teeth 56, is shown at an early cutting stage. The cutters 57, 57', 57", whose axes are denoted at 58, 58', and 58", respectively, are spaced about the axis 59 of the blank.

The axis of each cutter is inclined to the axis 59 and intersects the axis 59 when extended. Through this inclination cutting clearance or relief is provided so that top lands of the cutting teeth 60 of the cutters can be kept parallel to the respective cutter axes. This not only simplifies the structure of the cutter and its manufacture, but it also provides a cutting edge which stays at the same distance from the cutter axis during the entire cutter life. This is especially useful when the cutter is rotated on its axis while cutting as in one embodiment of the invention to be described hereinafter.

The cutters used in this embodiment of the invention have teeth of progressively increasing depth, and of a width at their tips 61 which decreases with increasing depth. The outer ends 61 have a progressively increasing distance from the cutter axis 58. The roughing teeth 60a to 60w cut with their outside edges 62, and the finishing teeth 60y, 60z with their side cutting edges, such as the edges 63, 64 of the tooth 60z. Here, also, the cutting faces 65 (Fig. 4) of the teeth may lie in a single conical surface coaxial with the cutter. The tip cutting edges 62 are shown concavely curved to conform to the curvature of the blank 55. Also the sides 63', 64' of the roughing teeth of the cutter are shown as having straight profiles. Thus, the side edges of the roughing teeth will be displaced laterally away from the produced tooth surfaces of the gear everywhere except at their tips.

Roughing teeth, which have side edges that match the tooth space to be cut on their whole height, are apt to rub. Such rubbing is avoided with the side cutting edges 63', 64', which are spaced from the sides of the tooth space everywhere but at their tips.

It should be understood that side cutting edges, such as straight edges 63', 64', and concave tip edges 62 can also be used on the type of cutter 42 shown in Figs. 1 and 2; and that the structure of the cutter 42 can also be applied to the cutter 57. Except for the different cutter position, the process can be carried out with cutters 57 as described for cutters 42. Again the reciprocating movement is preferably imparted to the gear blank 55, and the clapping motion is performed by the cutters 57, 57', 57".

Hereafter, in describing other modifications of the invention, cutters with cutting teeth having top lands parallel to the cutter axis will be shown. It is to be understood, however, that cutters, such as shown in Fig. 2, can be used instead.

Fig. 5 shows in an exaggerated manner a set of cutters 67, 67', 67", whose axes are denoted at 68, 68', 68", respectively. Each cutter is shown with only three roughing teeth, in order to show up the difference between the teeth. These teeth are denoted 70a, 70b and 70c for cutter 67; and the corresponding teeth of cutters 67' and 67" are correspondingly designated except that the reference numerals are primed and double-primed, respectively. The cutters 67, 67", contain each a final finishing tooth 70z, 70z", respectively, one for cutting one side of the teeth of the work and the other for cutting the other side of these teeth. The cutter 67' has no final finish cutting tooth. However, all three cutters have a side cutting tooth 70y, 70y', 70y", respectively, which can be classified as a finishing tooth, or a semi-finishing tooth. The teeth 70y, 70y", cut with one side only, which corresponds to the side finished by tooth 70z, or 70z", respectively. The other sides of these teeth 70y, 70y" stand back of the profile 75, which corresponds to the desired finished profile of the tooth space of the work, a sufficient amount to keep this other side clear. The finished profile shape desired is indicated by dotted lines on all the cutting teeth.

The roughing teeth cut with their tip edges 72, which reach sidewise within a specified small distance of the finishing profile 75. The side edges of the roughing teeth may follow the finished profile at a constant distance, but preferably will diverge from it so that the distance of the side edges of the roughing teeth from the finished profile is larger at the bottoms of the roughing teeth. Thus, the distance from the finished profile is larger at the root 76 of a roughing tooth than at its tip 72. The side edges 77 of the roughing teeth can also be made straight and in a direction to diverge from the finished profile 75. The finishing teeth of the cutters 67, 67″ may be provided with different cutting faces than their roughing teeth, cutting faces with side rake favoring the one side which each cutter finishes.

The axes 68, 68′, 68″ of the three cutters 67, 67′, 67″ are intended to be set to exactly the same position with respect to the axis of the workpiece or gear blank; and in the drawing are shown at equal distances from an axis 78. Concentric circles 80 have been drawn about axis 78. The radial distance between adjacent circles 80 indicates exaggeratedly the chip thickness to be removed by successive roughing teeth. The inmost circle $80_1$ corresponds to the tooth bottom of the finished profile 75 of the work. The cutters are shown in intermediate cutting positions.

When set up for operation, the first of the three cutters to cut is the cutter 67′. It cuts with its roughing tooth 70a′ pointed radially toward the work. The tip cutting edge of this cutting tooth is then tangent to the outmost circle 80. After each cutting stroke the work is indexed by one tooth, say in a clockwise direction. At first, none of the other cutters cut. With each indexing motion, that tooth space of the work into which the first cut was taken moves closer to the cutter 67″; and just when it is indexed into the cutting position of cutter 67″, this cutter is also indexed so that its roughing tooth 70a″ is in cutting position and tangent to the second circle 80 from the outside. In the cutting stroke which follows, the cutter 67″ takes off its first chip, cutting to the depth corresponding to said second circle. In following cutting strokes, it takes the same depth of cut out of the succeeding tooth spaces of the blank as the blank is indexed tooth space by tooth space after each cutting stroke of the cutter. Gradually the first tooth space of the blank, which now has two cuts in it, moves up toward cutter 67; and just when this first tooth space is indexed into cutting position for cutter 67, the latter is also indexed, bringing its cutting tooth 70a into cutting position. In the cutting stroke which follows, this tooth 70a removes a third chip from said first tooth space of the blank. It cuts to a depth corresponding to the third circle 80 from the outside.

As the cutting goes on, the first tooth space with the three cuts in it moves gradually toward cutter 67′. When this space is indexed into cutting position opposite this cutter, the cutter 67′ is also indexed by one tooth. Its second roughing tooth 70b′ is then in cutting position and tangent to the fourth circle 80 from the outside. In the cutting strokes which follow, the second roughing tooth 70b′ removes the fourth chip, cutting as deep as corresponds to said fourth circle 80.

The process now goes on until full cutting depth is reached. All three cutters, that is, all cutters of the set, keep on cutting, each cutting a little deeper than the preceding one, and each being indexed after it has applied a given cut to all the teeth of the blank. The outside edges 72 of the roughing teeth of the different cutters of a set are seen to be tangent to different circles 80, so that the radial distances between adjacent cutting teeth of one cutter are filled in by cutting teeth of the other cutters of the set.

As an alternative, cutters identical, as regards roughing teeth, may be used in a set; and the several cutters may be set at slightly different radial distances from the work axis, to obtain progressive cutting chips of equal, or nearly equal thickness.

The cutters of Fig. 5 have the last finish cutting edges on the cutters 67, 67″. As the cutters are indexed in succession, they end their cuts in the same way as they started them, namely, in succession. Cutter 67 completes the final cut with its side cutting edge 73 after cutter 67″ completes the final cut on the opposite side with its side cutting edge 74. In the last cut, only one side if the tooth space is in cutting engagement.

If desired, the last or the two last indexing motions of the cutter 67″ may be delayed until the cutter 67 is also indexed. In the final finishing, then, the cutters 67 and 67″ are indexed into cutting position simultaneously, and cut simultaneously.

Instead of providing separate finish cutting edges on two separate cutters, however, the last finishing edges for the opposite sides of the tooth spaces may be provided on the same cutting tooth of one cutter. Thus, the tooth 70z can be designed to cut with both sides. Then there will be no other final finishing tooth.

Cutters for depthwise feed

The described cutters can also be used with depthwise feed. Thus, cutter 67 could be used alone for rough-cutting a gear, and also for finish-cutting if it has finishing edges on both sides. Since the chip thickness would be too large when only one cutter is used without depth feed, the first cut with a considered outside edge 72 should be applied with the cutter set further away from the gear blank. After the first cut has been taken in all the tooth spaces of the gear blank, the cutter is fed into a second position by the thickness of the chip desired. After this second cut has been taken in all the tooth spaces of the blank, the cutter is set in to the final depthwise position which it would have had when used without depth feed. When all of the tooth spaces have been cut in this final depthwise position, the cutter is indexed and withdrawn to its starting position depthwise. Then the cycle begins anew for the cutting tooth of the cutter which has newly been indexed into cutting position. In other words, at its different feed positions, the one cutter does substantially what the set of cutters did before. The feed cycle repeats for every cutting tooth of the cutter.

A more conventional form of depth feed can be used with a cutter designed for the purpose. This is illustrated in exaggerated manner in Fig. 6. The outside cutting edges 82 of the cutting teeth 83 of the cutter 84 have a constant distance from the cutter axis 85. They lie on a circle 82′ concentric with axis 85. The profiles 86 of the cutting teeth 83 are the same as the profiles 77 of the teeth 70 of cutter 67, but the whole profiles of the cutting teeth have been set out radially as compared with cutter 67. In other words, while the outside edges 82 lie in a circle, the roots 87 of the cutting teeth 83 have a varying distance from the cutter axis 85 and therefore lie on a spiral about the cutter axis. A cutter of this kind can be used with continuous depth feed, or with a continuously progressing stepwise depth feed. The chief application of this cutter is as a single cutter, feed being used to increase the number of cuts depthwise in the work to a multiple of the number of cutting teeth of the cutter. The cutter is thereby made of practical size.

It is also possible to employ a plurality of cutters of this last-described type to operate on a single gear blank. This, however, complicates the machine structure, for each cutter then has to perform a depthwise feed in addition to its clapping motion. It permits, however, using a plurality of identical cutters at identical distances from a gear blank. These cutters are indexed simultaneously rather than successively.

Application of the invention to other forms of gears

Fig. 7 illustrates an application of the invention to cutting toothed face couplings. Here a cutter 89 may be employed having roughing teeth 90 which are of progressively increasing depth like the roughing teeth of the cutters previously described. The cutting teeth 90 have wide tip cutting edges 94 whose width decreases with increased depth. The cutter is reciprocated in the direction 91 of the bottoms of the teeth 95 of the work 92, while the clapping motion on the return strokes of the cutter is performed by the work. The clapping motion and the depthwise feed motion, if one is employed, are both in the direction of the axis 93 of the work.

Either a single cutter 89 or a plurality of cutters may be used to cut blank 92. Where a plurality of cutters are employed, one cutter is preferably set to follow and finish one side of the teeth of the work, while another cutter is set to follow and finish the opposite side of the teeth of the work. A third cutter may apply a central cut in the tooth spaces.

Fig. 8 illustrates an application of the process to the cutting of bevel gears with formed cutting edges by means of a cutter 95 of the type disclosed. This application of the invention is similar to that shown in Fig. 7. Here, however, provision has to be made to set the work 96 at an angle depending upon its cone angle.

Cutting helical teeth

A most important application of the present invention is to cutting helical teeth. Helical teeth are cut most efficiently by a cutting motion which is composed of a reciprocation in the direction of the axis 97 of the helical gear blank 98 and of a turning motion about blank axis 97. In other words, the cutting motion is a helical motion along and about the work axis. It is preferably performed by the work.

This cutting motion produces chips which extend for the whole length of the helical teeth 99 of the work from one end to the other of the teeth.

In previous attempts to cut helical gears with form cutting edges and this kind of a cutting motion, a chief difficulty has been the problem of securing sufficient relief to obtain cutting clearance back of the cutting edges of the cutter and clean cutting. A tool with concavely curved cutting edges set to the helix angle at the pitch surface of the work, and gradually fed in from the outside to full depth position should have cutting clearance in all its feed positions. This requirement gives most difficulty on pinions, where the helix angle at the tops of the teeth is substantially larger than at the pitch surface. A formed tool with concavely curved side cutting edges for cutting both sides of a tooth space should have sufficient relief to clear the increased helix angle near the outside of the blank, when, at the start of the cut, the tool is cutting at a shallow depth. This shallow depth portion has the lowest inclination or pressure angle of the concavely curved profile; and the relief is least effective there. To clear near the start of the cut unduly large amounts of relief have previously been required, so that the tool has been apt to be impractical and have too short a tool life.

The present invention avoids this difficulty by using each cutting tooth only in one position, or in a small range of positions, not in all depth positions. The result is a practical tool, which permits the most effective kind of a cut, in which the chips extend for the whole length of the helical teeth.

Fig. 9 illustrates a preferred way of cutting a helical gear. The cutters 100, 100', and a third cutter, not shown, are of the same character as the cutters 57, 57', 57" of Fig. 3. Each cutter has longitudinally straight cutting teeth 101 which extend parallel to its axis (102, 102' for the two cutters shown); and each cutter has cutting teeth with concave side profiles complementary to and matching the tooth profiles of the gear to be cut. It is possible to use the same cutters for cutting spur gears and helical gears, but, of course the tooth number of the helical gear, which can be cut with the cutter, must be different from the tooth number of the spur gear, which can be cut with the cutter, so that approximately the same tooth profiles result in the normal sections.

Each cutter 100, 100' is adjusted about an axis 103 extending radially of the work axis 97, to the helix angle of the teeth 99. Axis 103 intersects the cutter axis 102 and lies in a plane perpendicular to the work axis 97. The cutters 100 are set to the helix angle at the pitch radius of the gear blank 98; or, if desired for purpose of relief, at the helix angle at a radius smaller than the pitch radius and larger than the root radius of the work.

The cutting operation is the same as already described except that the work is turned on its axis as it is reciprocated along the axis. The work is preferably indexed after each cutting stroke. With helical teeth the depthwise feed of the plurality of cutters is also preferably avoided; and the cutters are indexed successively as described with reference to Fig. 5. The cutters of Fig. 5, in fact, may also be considered a set of cutters for cutting helical teeth. The cutters of a set may differ slightly from one another to permit setting up in exactly the same position with respect to the axis of the work.

Cutters, such as described with reference to Fig. 6, can also be used in cutting helical teeth with depthwise feed. They are tilted for helix angle, like the other cutters, about an axis radial to the work axis; and they are fed in the direction of said radial axis.

Cutters with straight teeth parallel to the cutter axis have the simplest possible shape; and the cutting load produces practically no turning moment on the cutter. It is easy to hold such cutters rigidly against rotation.

It is possible, also, however, to use cutters such as shown at 110 (Fig. 10) with helical teeth 111 coaxial with cutter axis 112. Such cutters can be used without tilt for helix angle, since the helix angle is already built into the cutter. They can be used also on machines without provision for helix angle tilt. Right hand cutters and left hand cutters are, however, required for cutting, respectively, the two members of a helical gear pair.

Further cutters

Fig. 11 shows exaggeratedly a cutter 120, similar to the cutter 67 of Fig. 5, and capable of cutting straight teeth or helical teeth. Cutter 120 differs from cutter 67 by having roughing teeth 121 tipped with cutting bits 122 of harder material, such as tungsten carbide. The finishing teeth 121y, 121z of this cutter, are of the same material as the cutter body, preferably high-speed steel or tool steel.

Since the best finish is applied at slow speed, the cutting speed and the cutting cycles are preferably slowed down for the last cut or cuts. The tipped roughing teeth of the cutters permit a much higher speed for the removal of the principal amount of stock from the blank.

Tipping of the cutters is simple because the roughing teeth 121 cut with their outside edges, which are straight. The inserts have straight edges.

Fig. 12 shows a cutter 130, similar to the cutters 57, 67, 100, but having its finishing teeth 131 formed on an insert 132. The finishing teeth have side cutting edges 133 of concave profile; and the last tooth applies the final shape to the work. Insert 132 comprises a circular disc portion 134 resting in a recess in the cutter body, and secured thereto by screws 135.

The roughing teeth 136 have a gradually increasing depth, and top lands 137 at different distances from the axis of the cutter. The width of these top lands decreases with increasing depth of the cutting teeth. The side profiles 138 of the roughing teeth may be straight.

When cutters of this type are used in a set, the cutter bodies with all the roughing teeth may be the same on all cutters of the set. The positions of the respective cutters are slightly different to provide successively deeper cuts, as described above. The finishing inserts of the several cutters are, however, different, to allow for the different radial positions of the cutters.

The cutter 130 can also be used for roughing only, in which case the finishing insert 132 is removed.

Fig. 13 shows a cutter 140 having provision for a finishing insert at slot 141, but containing, as shown, only roughing teeth 142. Cutters of this type may be used when it is desired to finish the gears with a conventional shaving operation rather than with formed finish-cutting edges.

Cutter 140 is of the type intended for feed motion. Its tip cutting edges 143 have all the same distance from the cutter axis and lie on a circle 145 concentric with the cutter axis; but the bottoms of its interdental spaces are arranged in a spiral about the cutter axis.

Fig. 14 shows on a greatly enlarged scale a desirable way of arranging the profiles of the roughing teeth, or of the cutting teeth with gradually increasing depth. It applies to either type of cutter, namely, both to the cutters having their tip cutting edges arranged in a spiral and to the cutters having their tip cutting edges arranged in a circle, as in the cutter 140 of Fig. 13.

Fig. 14 shows the profile 150 of the tooth space to be cut by the cutting teeth of increasing depth; and it shows some of the end cutting edges 151 superimposed in the tooth space. Adjacent the profile 150 the cutting edge bends, and then follows the profile 150 for a small distance. This portion 152 may be the straight tangent to profile 150 at the middle of said distance, or it may be a convex arc, or it may be a profile 150 itself. A straight edge 153 connects this portion with the root of the cutting tooth in a direction diverging from the profile 150.

When the cutting edges of the teeth of increasing depth are arranged in this manner, a good finish is produced even by these teeth. Gears can be finish-cut in this manner when desired to reduce the cost.

Cutter honing

In the process of the present invention the clapping motion is larger than in conventional gear shaping, so that the work can be indexed on the return strokes of the cutters. As already pointed out, the plurality of cutters provides a dynamic mass balance for this motion. Moreover, the variation in kinetic energy is furnished by an inertia member. It will now be shown how the large clapping motion required can actually be a substantial asset.

In accordance with one phase of my invention, a cutting tooth is honed after each cutting stroke. First any chip, which may cling to the cutting face, is removed; and then the cutting face is honed in the way hand honing is performed, namely, from the outside in.

Figs. 15 to 18 inclusive illustrate the principle. These figures show a cutter 160 in different positions of the clapping motion. The cutter is shown in axial section, and might be any one of the cutters described.

The honing tool consists of two parts. Part 163 is rigidly guided and serves to clear the cutting face 164 of the cutter of any chip which might cling to it. Part 165 serves for honing proper. It is connected with part 163. Thus, it may be bonded to it with a layer 166 of a rubber or a rubber-like substance. Its end 167 is ground flush with end 168 of part 163, while part 165 is maintained in a displaced position, so that end 167 advances beyond end 168 when the constraint is removed, that is, when left to itself. The advance of part 165 is restricted, and kept at a very small amount by a pin 170 which has a tapered end and which is rigidly held by the part 165. The pin engages a tapered bore 171 in part 163, with backlash, so that it can move back a slight amount, but cannot move forward more than the design permits.

The dotted lines 160c in Fig. 15 represent the cutting position. The clapping motion is along a radial line 161 so that the cutter is displaced in the position shown in full lines. As the cutter reaches its withdrawn position, the honing tool 162 is still out of contact with the cutter.

In operation, the honing tool 162 moves forward, for instance, along the line 173 inclined to radial line 161, and reaches the level of the cutting face 164 after the cutter 160 has reached its fully withdrawn position. This is shown in Fig. 16. In this position, the carrier 174 (Fig. 18) of tool 162 is in contact with a stop 175 that engages projection 176 of the carrier. The stop is on the clapping slide. It permits relative motion in the direction of the cutting face. With the provision of such a stop, the end 168 of part 165 can be set very close to the desired profile line of the cutting face without danger of being caught by the edge 177 of the cutter. Such close position is required to insure catching all chips without riding over them. As the cutter 160 again moves forward toward cutting position, see Fig. 17, from its fully withdrawn, or fully clapped, position, part 163 pushes off any chips.

As the cutter moves forward further, its cutting face 164 is swept by the end 167 of the honing tool from the outside in, under a predetermined moderate contact pressure. This pressure is controlled by the forced displacement of part 165 while the ends 167, 168 are being ground.

As it hones, a stream of cutting coolant is pressed through an opening 180 in front of the honing part 165 (Fig. 15) to keep the surface wet for honing.

Honing reconditions the cutting face for each new cut with the result that the tool life is extended, and clean cuts are obtained.

Chamfering

Burring and chamfering may also be performed in the same operation as cutting. Helical teeth especially need to be chamfered at their sharp corners.

Fig. 19 shows how the motion of the work can be used for chamfering the sharp corners of the helical teeth. The gear blank 184 is shown twice in section along its cylindrical pitch surface, developed into a plane, namely, in the two end positions, respectively, of a cutting stroke. In the development shown, the helices 182 of the teeth 183 appear as straight lines. In the cutting stroke a point 185 of the blank moves in a helical path to a position 185'. If it were not for the indexing it would move back to 185 during the return stroke. Indexing of the work causes it to return to a position 186 instead. Similarly, point 188 moves to 188' during the cutting stroke, and to a position 189 in the subsequent return stroke.

Directions 185'—186 and 188'—189 are inclined to the teeth 183 enough that the corners at points 185' and 189 can be clipped off or chamfered. When tools 190, 191 are placed in the fixed positions indicated, they will move relative to the gear blank 184 in the space between the teeth 183 during the cutting stroke, and clip off the corners at 185'' and 189'' on the return stroke. This operation is repeated on other teeth in subsequent strokes.

It should be noted that the cutting motion is performed entirely by the work, while the tools 190, 191 stand still. The chamfering should, however, start only after the gear teeth have been cut to nearly full depth, and the tools, 190, 191 should be out of reach of the work during the main depth roughing. This is accomplished by feeding the tools 190, 191 slowly to the final position shown, the feed being in radial directions toward the work axis.

Chamfering simultaneously with cutting is a desirable, but is not an essential feature of the invention.

Cutter mounting

A machine built according to the present invention for cutting gears according to the present invention is illustrated in Figs. 20 to 34 inclusive. The cutter mounting in this machine is shown in an axial section in Fig. 20, in a cross section in Fig. 21, and Figs. 22 to 28 show details thereof.

Each cutter 200 is rigidly secured to a spindle 201, as by means of a key, not shown, and a nut 202, which threads onto the end of said spindle. A spacer 203 is interposed between the back of the cutter and the flange 204 of the spindle 201. The use of a set of spacers 203 permits maintaining the cutting face 205 of the cutter always in the same position at all stages of the cutter life. When the cutter is resharpened by grinding off say .010 inch from its cutting face measured axially, a spacer 203 is used, which is .010 inch thicker than the previous one. In this way the cutting face stays at the same place always.

The spindle 201 is made of two parts with flanges 204 and 206, respectively. The two parts are rigidly connected by a toothed face coupling 207 of known type, held together by a screw 208.

Rigidly secured to flange 206 are an index plate 210 and a gear 211. The plate and gear form a unit. A taper pin 212 may be used for exact location of the gear and index plate angularly relative to one another and relative to flange 206, but these parts may be secured together by screws or any other suitable means.

The index mechanism for the cutter is actuated periodically by a shaft 215 which carries an eccentric pin or roller 216. To operate the cutter index mechanism, the rotating shaft 215 is advanced axially, as will be described hereinafter. Shaft 215 is journaled in a slide 217 adjustable in a direction radial of the work axis 220 in a tiltable cradle 221 (Fig. 21). The slide 217, in turn, carries the clapping slide 222 on which the cutter spindle 201 is rotatably mounted. The clapping slide is movable on the slide 217 also in a direction radial to the work axis 220, to move the cutter to and from cutting position. The cutter is shown in cutting position. The clapping motion is effected by a barrel cam 223. The clapping slide 222 carries a roller 224 which engages the track of this cam. The cam 223 makes one revolution per cutting cycle. Its axis coincides with the axis 225 (Fig. 21) of angular adjustment of the cradle 221. The cutting face 205 of the cutter is aligned with the axis 225.

The cradle 221 is adjustable angularly about axis 225 in a support 230 (Fig. 21) to set the cutter to the required helix angle when cutting helical gears. The support 230 in turn is angularly adjustable on a common base 231 about the axis 220 of the work.

The cutter mounting structures are the same for all the cutters of the set which are to cut the work simultaneously. On one cutter, however, the support is fixed to the common base 231, and requires no adjustment. The other supports are adjustable, however, to set their cutters in line with the tooth spaces of the gear blank, where the tooth number of the gear, which is to be cut, is not a multiple of the number of cutters; for instance, not a multiple of three when three cutters are used.

The common base 231 can be raised vertically to permit chucking and dechucking the blank.

A beam 232 (Fig. 21) engages the cylindrical outside surface 233 of a part 234 rigid with the slide 217 to permit clamping of the slide 217 to the cradle 221 and clamping of the cradle to the support 230. Beam 232 rests at one end 235 in a slot provided in the support 230. At its other end it is secured to said support by a screw 236 through an intermediate deformable gasket 237.

The clapping motion of the cutter slides 222 at the ends of the cutting strokes, and the intermediate indexing motions of the cutters, are derived from a gear 240 (Fig. 20) which is coaxial with the axis 220 of the work 241. The gear 240 itself is driven by a vertical shaft. Fig. 22 shows diagrammatically the geared connection between this vertical shaft and the gear 240. The pitch circles of the gears only are indicated being shown in heavy dash and dot lines. Secured to the vertical shaft to turn therewith is a pinion 242. It drives the gear 240 through an idler gear 243 with a fixed axis. The gear 240 is rotatably mounted in a part rigid with the common base 231.

Rigidly secured to the gear 240 is a bevel gear 245 (Fig. 20). It meshes with a bevel pinion 246 that is secured to the shaft 247. The latter is rotatably mounted in the support 230 in bearings 248, 250. At the end of the shaft opposite to the pinion 246, a flanged member 251 is rigidly secured to the shaft as by a screw and key. Mounted on the hub of the member 251 rigid therewith is a helical pinion 252. It is pressed toward the flange of member 251 through a spacer 253 by screws 254.

Pinion 252 meshes with a gear 255 that is coaxial with the shaft 256, on which the cam 223 is mounted. Shaft 256 is slidable in the hub of the gear 255, and has a spline connection therewith. The cam shaft 256 is rotatably mounted by bearings 257 and 258. Bearing 257 fixes the shaft axially on slide 217. Bearing 258 is seated on the hub of the gear 255.

Adjustment of the cradle 221 about the cam axis affects the cam timing. The cam timing is also affected by an angular adjustment of support 230 about the work axis 220. The required timing is restored by disengaging the pinion 252 from gear 255, as may be done by moving it out of reach axially. The gear 255 is then turned through a predetermined integral number of teeth, while the pinion shaft 247 is maintained stationary.

Further timing through part of a pitch is attained by substituting another spacer 253, that is, by securing the pinion 252 in a different axial position. A change in axial position of the helical pinion 252 along a straight keyway turns the gear 255 and produces the required total timing change.

The work 241 is reciprocated along its axis 220 in any suitable manner. To cut straight teeth on the work, the reciprocation is in the direction of the work axis only. To cut helical teeth, the work is also turned on its axis as it moves along its axis. Indexing is added on the return stroke. In one embodiment for cutting helical teeth, the work is rotated uniformly and continuously on its axis, while it is moved in the direction of the work axis at a uniform rate during the cutting stroke.

Regardless of what way the work is moved, the cutting motion and indexing is performed by the work so that each tool enters a different tooth space on successive cutting strokes. Gear 240 turns at a rate of once per cutting cycle, that is, per cutting stroke and return stroke. Cam shaft 256 turns at the same rate, and cam 223 advances the cutter to the shown cutting positon just before the start of the cutting stroke. At the end of the cutting stroke, the cam 223 withdraws the cutter to clear the work.

In this clapping motion, there is considerable change of kinetic energy. The kinetic energy is zero at the times when the cutters stand still in their forward and in their withdrawn positions. It is a maximum at the top speed of the clapping motion.

In accordance with my invention, the changing kinetic energy of the clapping motion is directly supplied to gear 240 by an inertia member 260 (Fig. 20) through a geared connection. This geared connection consists of a cylindrical pinion 261 rigid with the inertia member 260, and of a varying ratio face gear 262 formed integral with the gear 240. The inertia member 260 is rotatably mounted at 263 and 264 in parts rigid with the common base 231.

Fig. 23 shows the positions of the parts of each cutter indexing mechanism when the cutter is in cutting position. The locking dog 271 is then in engagement with a notch of the index plate 210 (Fig. 20); and the end of arm 274, which is rigid with dog 271, is in engagement with a circular portion 277 which is rigid with the slide 217 and coaxial with the index plate. Through this engagement the locking part is positively locked. Spring 280 also keeps the locking dog 271 in engagement with the index plate. Like gear 211 and index plate 210, the shaft 270, to which the locking dog 271 is secured, is also mounted on the clapping slide 222. When the parts are in cutting position, the pin 216 and its supporting disc 272 are out of reach of the Geneva wheel 273, and of the arm 274 which is secured to shaft 270. As shown in Fig. 25, the Geneva wheel 273 with its shaft, and its change pinion 275 are also mounted on the clapping slide on a projection 276 thereof.

Ordinarily the pin 216 and its disc 272 are out of reach of the Geneva wheel 273 and of the arm 274 even in the withdrawn position of the cutter. Engagement is effected only after shaft 215 with pin 216 is advanced axially for indexing.

Fig. 24 shows the positions of the parts of a cutter indexing mechanism when the cutter is in its back or withdrawn position, and the indexing operation is under way. Arm 274 has moved away from circular portion 277 while the locking part 271 has been withdrawn from engagement with the notch of the index plate 210. It is normally kept in engagement with the index plate through force of spring 280.

To index the cutter, the shaft member 215 with pin 216 is advanced along its axis so that the pin 216 comes into operative relation with the Geneva wheel 273, and the disc 272, which carries the pin 216, gets into operative relation with the arm 274. The outside surface of the disc 272 is formed as a cam track 282 adapted to engage the end of the arm 274 or a roller mounted thereon. Through the engagement with cam track 282, the arm 274 is turned and with it the shaft 270. The locking dog or pawl 271, which is secured to the shaft 270, is thereby withdrawn from the index plate 210, releasing the plate. The pin 216 then enters a slot of the Geneva wheel, and indexes the Geneva wheel. The pinion 275 (Fig. 24), which is rigidly secured to the shaft 283 of the Geneva wheel is thereby rotated. It meshes with and turns the gear 211 (Fig. 20), and with it the index plate 210. When the indexing motion is completed, the cam track 282 (Fig. 23) lets the arm 274 swing in, and the locking part 271 engages another notch of the index plate under urge of the spring 280. The shaft member 215 then recedes axially, and the cutter moves forward to cutting position, with the parts resuming the positions shown in Fig. 23. The indexing operation is thus completed.

*Ease-off*

Frequently it is desirable to ease-off the ends of the teeth, that is, to take off a little stock from the tooth ends. A preferred way of accomplishing this will now be described with reference to Fig. 26, for the case where the finishing edges for opposite sides of the teeth are provided on different cutters. One of the cutters then applies the final cut to one side of the teeth; and another cutter applies the final cut to the other side of the teeth. To produce the desired ease-off, a finishing cutter is very slightly turned on its axis during its cutting stroke to take off extra stock at the tooth ends. At the middle position of the cutting stroke, the cutter stands still instantaneously, that is, it reverses. At the start of the cutting stroke, the cutter is in the position turned to take off the extra stock desired at one end of a tooth of the blank, and then moves about its axis very slightly away from the center line of the tooth whose one side it finishes. It reaches its maximum distance from said center line at the middle of the cutting stroke. From then on it moves in again, toward said center line.

It thereby cuts a thinner tooth at the tooth ends than at the middle, and accomplishes the desired ease-off. In other words, the shaft 270 with the locking dog 271 should be rocked about the axis 201' (Fig. 26) of the cutter to turn the cutter during the cutting stroke. This rocking motion is very small since all it has to produce is an ease-off in the order of .001 inches at the tooth ends. In this rocking motion, the axis of the shaft 270 moves in the peripheral direction, at right angles to a plane containing the axis 201' and the axis of the shaft 270. Since the motion is so very small, it is sufficient to move the axis of the shaft 270 in a peripheral direction. This is accomplished by moving it with an eccentric 285, whose axis lies in the plane containing axis 201' and the axis of the shaft 270 in its middle position. The motion of the eccentric on its axis 286 is controlled by a cam 287. This cam is secured to the hub of gear 288 (Figs. 26 and 20), which is coaxial with the shaft 215 and which drives shaft 215.

Cam 287 acts on a roller 289 mounted on an arm 290 rigid with the eccentric 285. A spring 291 maintains the roller 289 in engagement with the cam 287. The eccentric 285 is pivotally mounted on a projection 292 rigid with the clapping slide 222.

Gear 288 (Fig. 20) is rotatably mounted on slide 217, and is driven at a one to one ratio by a spur gear 293 which is rigid with cam 223. Gear 288 is a tapered face gear. Such a drive is preferred to a bevel gear drive because the spur gear 293 is used also to drive a further spur gear discussed hereafter. Cam 287 may be split, if desired, to facilitate change of cams.

*Indexing control*

A sleeve 300 (Fig. 20) is rotatably secured to the lower end of shaft 215 and is axially fixed thereto. This sleeve carries a pair of coaxial pins 301 (Fig. 27) which extend at right angles to the axis of shaft 215. The pins 301 carry a pair of blocks 302 which are engaged by the forked end of a lever 303. The lever 303 is pivotally mounted at 304 on slide 217, which also carries shaft 215. A strong spring 305 tends to turn the lever 303 on its pivot 304, to thereby move the shaft 215 upwardly into indexing position. This tendency is ordinarily prevented by a catch 306 which engages a slightly tapering slot in the tail 307 of lever 303. The catch is kept in engagement with its slot by a leaf spring 308. A solenoid 310 acting on an extension of the catch is used to release the catch 306 intermittently.

When the catch is withdrawn through action of the solenoid, lever 303 is turned on its pivot by spring 305, and moves the shaft 215 upwardly. This upward motion is controlled by the engagement of the spherical end 216' (Fig. 28) of pin 216 (Figs. 20, 23 and 24) with a stationary track provided on a part rigid with the slide 217 and above shaft 215. The shaft is rotating; and as the shaft is lifted by spring 305, end 216' of pin 216 drops into recess 311 and travels along that recess until the cam surface of the recess depresses the shaft again against resistance of spring 305. The track 311 is shown in development in Fig. 28.

Track 311 prevents the shaft 215 from shifting to its end position at once under urge of spring 305. It lets the shaft move in at the proper time, and it also returns it again after completing indexing. In other words, the shaft 215 is returned through this engagement almost to the same axial position it started from. By the time of the return, the solenoid 310 is deenergized. The catch 306 then advances into its slot in the end 307 of the lever 303, and in its movement lifts the spherical end 216' very slightly away from the outer end of the track 311 and locks the lever 303. Then the end 216' will come very close to the outer end of the track 311 but not rub on it. The rotation of shaft 215 goes on continuously; and when the solenoid 310 again releases the catch 306, another cutter indexing operation is started.

There is one solenoid for each cutter, the other solenoids being denoted at 310' and 310'' in Fig. 27. 315 and 316 are two terminals connected to a source of electrical power, such as a battery. Each solenoid is in the circuit leading from one terminal 315 to the other terminal 316 through the solenoid and through a switch. The switches for the several cutters are indicated diagrammatically at 317, 317', 317''. Each switch comprises a closed housing in which a plunger is movable, which makes and breaks contact. On one side the plunger projects outside of the housing and has there a sharply rounded end 318 adapted to engage a projection 320 of a cam 321. Each switch housing is rigidly secured to support 230 (see also Fig. 20) and is adjusted with it about the work axis 220. This automatically takes care of the change of timing required when this adjustment is made.

When three cutters are used, and the tooth number of the work is a multiple of three, the supports are equally spaced about the work axis, and the cutters are indexed at equal intervals when projection 320 closes the respective switch 317, 317', or 317''. A cutter is indexed after having taken a given cut in each tooth space of the work, that is, after the cutter has made as many cutting strokes as there are teeth in the work. Accordingly, the cam 321 is geared to make one revolution in that time.

When the tooth number of the work is not a multiple of the number of the cutters, supports for two cutters are adjusted so that there is an integral number of teeth or pitches between any two cutters. This changes the index timing as it should be changed. The time interval of the indexing motion of the cutters is proportional to the number of tooth pitches between them.

Instead of closing an electric circuit to release the catches 306, an arrangement can also be made to release the catches by opening a circuit, as is readily understood, or they can be released by any other suitable means.

Cam 321 (Fig. 27) is rigidly secured to flange 323 (Fig. 20) of a shaft 324 which extends through a central bore provided in the hub of gear 240, and is journaled therein. At its upper end, a gear 325 is rigidly secured to the shaft 324. It is driven by a small pinion 326 secured to a counter shaft 327. This shaft is journaled in a circular slide 330 that is adjustable angularly about the axis of gear 325, which is also the axis 220 of the work. The slide 330 can be secured to the common base 231 in any position of adjustment.

Secured to the flange provided on the shaft 327 is a change gear 332 which receives motion from another change gear 333 (Fig. 22), rigid with the idler 243. This gear drive is indicated in Fig. 22 by the pitch circles of the gears shown in light dash and dot lines. The change gears are so chosen that the turning ratio of concentric gears 240 and 325 is equal to the tooth number of the work.

If two cutters are to finish opposite tooth sides respectively, and it is desired to index these cutters simultaneously during finishing, the switch 319 (Fig. 27) may be opened, and connection effected with contact 314. This causes the solenoid 310'' to be operated simultaneously with the solenoid 310 from switch 317. The shifting of switch 319 can be performed automatically, if desired.

Honing

A suitable honing arrangement operating according to the principles already described is indicated in Fig. 32 which is a fragmentary view taken along the axis about which the cutter is tilted for helix angle of the gear to be cut. The honing tool 340 is secured to a lever 341 pivoted at 342 on slide 217. It is moved by means of a cam 343 secured to a shaft 344 extending parallel to the axis of cutter tilt and mounted on slide 217. A spur gear 345 secured to shaft 344 at its end opposite from that, to which cam 343 is fastened, meshes with the spur gear 293 (Fig. 20), previously mentioned, at a one to one ratio so that the cam 343 turns once per cutting cycle. The cam 343 acts on a roller 347, mounted on lever 341, that is kept in engagement with the cam by a torsion spring 346 coaxial with pivot 342.

The honing tool 340 is moved up to the cutting face 205 of the cutter at the proper time, and is withdrawn from it through cam 343 and spring 346. It removes the chip which might cling to the cutting face with its front portion 168 (Figs. 15 to 18); and it hones the cutting face under a predetermined pressure with the rear portion 167 visible in Fig. 32. A coolant may be admitted through an opening between said two portions, as described with reference to Figs. 15 to 18. The admission of the coolant may be effected and controlled by a plunger pump, whose plunger is moved by a cam secured to the shaft 344 and not shown. The main stream of coolant is admitted through a nozzle 348 (Fig. 20).

The work support

The above described cutter mounting may be used with different kinds of work supports and work drives. One of these applies to helical teeth only and comprises means for rotating the work uniformly and continuously on its axis while reciprocating it along its axis at a uniform rate during cutting. The work turns through an integral number of teeth per reciprocation, a number preferably prime to its tooth number if larger than one.

The form of work support illustrated in Figs. 29 and 30 permits of cutting both straight and helical teeth.

The work 241 is rigidly secured to a ram 360 that is reciprocable along straight guide surfaces 359 inside of a hollow spindle 361. The work therefore turns with the spindle 361 whose axis coincides with the work axis 220.

Rotatably mounted on the spindle 361 coaxially therewith are a pair of swinging members 362, 363 containing gear teeth 364, 365. These engage rack teeth 366, 367, provided respectively on two sliding bars 368, 369. Each bar is reciprocable by means of a Scotch yoke drive having an adjustable crank pin 370, 371, respectively. These crank pins are rigid with slides 372, 373 radially adjustable on face plates 374, 375, respectively, provided at opposite ends of a shaft 380. This shaft may be made of two or more parts rigidly connected together by toothed face couplings of conventional form.

The shaft 380 is journaled in bearings 381, 382 in the machine frame. It receives motion through a gear 383 rigidly secured to it. Rotation of shaft 380 and of the face plates 374, 375 reciprocates the sliding bars 368, 369 to a degree controlled by the adjustment of their crank pins 370, 371.

For cutting straight teeth, the crank pin 371 may be set to zero, and the swinging member 363 is locked against oscillation. Only bar 368 reciprocates, and only member 362 is oscillated. During the cutting stroke, then, the spindle 361 is connected to the now stationary member 363. This is accomplished by a pawl 385 carried by a part 386 (Fig. 29) rigid with member 363. This pawl engages a notch of the index plate 390 rigidly secured to the spindle 361. The swinging member 362 carries a similar pawl (not shown) on a part 387 rigid with said swinging member.

At the end of a cutting stroke, the swinging member 362 is connected with the index plate 390, while the pawl 385 recedes from the notch it held. During the return stroke, then, the spindle 361 moves with the swinging member 362 and is thereby indexed. At the end of the return stroke, the spindle 361 with the index plate 390 is disconnected from the swinging member 362 and reconnected with member 363.

The cutting and return strokes of the work are effected by a crank plate 391 with an adjustable crank pin 392. This crank plate 391 is rotated on an axis directly underneath the shaft 380. It has a gear meshing with gear 383 at a one to one ratio. Crank pin 392 reciprocates slide 393 in direct proportion to the motion of the sliding bars 368, 369. Rigidly secured to slide 393 is a bar 394 which contains inclined rack teeth 395 on one side. These teeth are shown in section in Fig. 30, and in front elevation in Fig. 31. They engage matching teeth 396 provided in a part 397 which is secured against turning and which is connected with the ram 360 at 398 through a bearing, which is axially fixed to the ram. Reciprocation of the bar 394 reciprocates the part 397 and with it the ram 360.

On its opposite side the bar 394 has other rack teeth 400 which engage matching teeth provided in the sliding part 402 to move that part in a general direction opposite to the motion of the part 397. This part is attached to a mass portion (not shown) serving for counterbalance.

Cams 403, and 404 driven through gears 406, and 405, respectively, control the motion of the locking parts such as pawl 385 shown in Fig. 20.

When helical teeth are to be cut, the crank pin 371 of face plate 375 is adjusted to provide the required turning motion of the work during each cutting stroke in proportion to the cutting stroke. Adjustment of crank pin 371 to one side will produce one hand of teeth; adjustment to the opposite side will reverse the motion of the sliding bar 369, and produce teeth of opposite hand. As in the case of straight teeth, the spindle 361 with index plate 390 is connected with member 363 during the cutting stroke. This member swings during the cutting stroke, however, instead of being stationary, when the helical gear is to be cut. During the return stroke, spindle 361 is connected with the swinging member 362. The crank pin 370 is adjusted on face plate 374 to move sliding bar 368 so that swinging member 362 moves through an arc differing by one angular pitch from the arc described by swinging member 363. In this way, the work is indexed by one tooth on the return stroke.

Most of the varying kinetic energy of the moving parts is supplied directly by an inertia member 410 that has a varying ratio gear connection with the shaft 380, and that is rotatably mounted in the machine frame. The gear connection comprises a cylindrical pinion 411 which is rigid with the inertia member 410, and a face gear 412 rigid with the face plate 374. The teeth 413 of the face gear are arranged at a varying distance from the axis of the gear to provide the required varying turning velocity of the inertia member 410.

If desired, a protective cover 415 may be provided which turns with the spindle 361 (Fig. 30). The chips falling on it can then be swept off the moving cover by a stationary part 416.

For further details of the structure of the work support, of the inertia member, and the dynamic mass balance provisions, reference is made to my two above mentioned patent applications.

*General disposition*

Figs. 33 and 34 show the general disposition of a machine having a three cutter design. The work support and drive is placed in the machine base 440. The top 441 is supported by three columns 442 of circular cross section which are rigidly secured both to the base and the top. Adjacent both their upper and lower ends, the columns 442 have helical grooves 443 which constitute a helical thread with wide top lands 444. The thread at the base of each column is engaged by a pair of nuts 445, 446 disposed in an opening 447 of the base and abutting opposite sides 448 of the opening. The nuts are knurled, as denoted at 450, on their outer surfaces for better grip.

At the top of each column at opposite sides of the top 441 are a pair of nuts 451, 452, one acting through a washer 453. In this way, the columns 442 are rigidly secured both to the base 440 and top 441.

The cutters and cutter slides are carried on a common base 231 with which the elevator 231' is rigid. The columns 442 extend through fitting bores of the elevator 231'. Intermediate the upper and lower ends of the elevator are a plurality of openings 454, one for each column. A stop-nut 455 threads on each column. Each stop-nut is accessible through the associated opening 454. Each may be provided with a conical upper surface 456. The openings 454, as well as the openings 447, are wide enough to permit introducing the nuts through the openings.

The stop-nuts 455 serve to set the working position of the elevator 231', which is shown in its top or loading position. For cutting, the elevator is lowered until the sides 458 of the openings 454 contact the end faces 456 of the stop-nuts 455. Each of the sides 458 has an internal conical surface matching the external conical surfaces 456 of the stop-nuts. The working position can be adjusted by raising or lowering the stop-nuts 455 on their threaded columns.

To operate the elevator, a hydraulic cylinder 460 (Fig. 34) is provided in the top 441. A piston 461 is reciprocable in this cylinder. Piston 461 is rigidly connected with a recessed plate 462 which is secured to the elevator 231'. For movement of the cutters to cutting position, the elevator is hydraulically lowered until it contacts the faces 456 of the stop-nuts 455. After completion of the cutting operation, the elevator is hydraulically lifted to its loading position shown in Fig. 34.

It is of course important that the stop-nuts 455 be adjusted exactly to the same vertical positions. Their knurls 463 may be numbered; and they may be locked in the same positions by levers 464 pivotally mounted on the elevator at 465. The upper end of each lever 464 is secured by a screw 466 to the elevator 231'.

The machine is driven from an electric motor 470 located in the base. The motor drives the shaft 471 through a pair of change gears 472 and the fixed gear reduction 473. A pinion 474 secured to the shaft 471 meshes with the gear 383 (Fig. 29), and thus drives shaft 380 with the face plates 374, 375, and also the crank plate 391 that effects reciprocation of the work.

Shaft 471 also imparts motion to a vertical shaft 475 through a pair of bevel miter gears 476. This shaft has a sliding key connection with a coaxial hollow shaft 477 mounted in the elevator. The vertical shaft 477 has rigid with it a pinion 242 indicated diagrammatically in Fig. 22. It drives the clapping motion cam 223, and the cam 321 controlling cutter indexing.

Preferably the cutting cycles are slowed down for applying the last finishing cuts, to obtain a fine finish. Structure for slowing down the cutting cycles is already known, and is not illustrated specifically here since it forms no part of the present invention.

Where depth feed of the cutters is desired, this can be achieved by adding to the machine described means for feeding slide 217, instead of using this slide merely for radial adjustment. The cutters are then exactly identical in their roughing portions, and are simultaneously indexed from a single switch 317 (Fig. 27). The use of depth feed is especially attractive where a single cutter is used.

While the invention has been described particularly with reference to certain specific embodiments, it will be understood that it is capable of further modification and adaptation. Thus, a cutter may cut with two cutting teeth simultaneously instead of only one cutting tooth. The cutting teeth are then arranged in pairs; and their shape corresponds to two adjacent tooth spaces of the gear to be cut. This applies especially to gears with large tooth numbers.

Furthermore, internal gears may be cut with the present method and cutters. As many cutters are used as practical. Sometimes a single cutter may have to be used, with depthwise feed, cutting with a single cutting tooth at a time, although in some instances the cutter may cut simultaneously with a plurality of cutting teeth.

*Operation of machine*

In the operation of the machine shown, the work can be reciprocated axially and simultaneously rotated on its axis, the axial reciprocation being effected by crank plate 391 (Fig. 29) through rack 394 (Fig. 30), part 397 and ram 361, and the rotary movement being effected through crank plate 375 (Fig. 29), sliding bar 369, rack 367, oscillating member 363, locking dog 385, and index plate 390 which is secured to the work spindle 361. If straight, instead of helical, teeth are to be cut on the work, the crank pin 371 is set to zero, and sliding bar 369 is locked against motion. The work is then stationary on its axis during cutting, and only reciprocates axially.

After each cutting stroke and during its return stroke, the work may be indexed. For indexing, the pawl or locking dog 385 (Fig. 29) is disengaged from the index plate 390, and the similar pawl or dog (not shown) carried by oscillating member 362 is engaged with the index plate. The member 362 is driven from crank plate 374 through pin 370, sliding bar 368, and rack 366. Disengagement of pawl 385 at the end of the cutting stroke, and its reengagement at the end of the indexing operation are under control in conventional manner of a cam 403 (Fig. 30); and the engagement and disengagement at the ends of the cutting stroke and of the return stroke, respectively, of the like pawl carried by oscillating member 362 are under control of cam 404 (Fig. 30).

During each cutting stroke of the work, the cutters are, of course, in engagement with the work. During each return stroke of the work, the cutters are out of engagement with the work. Clapping of the cutters out of engagement with the work may occur at the end of each cutting stroke of the work; and the cutters may be returned into engagement with the work at the end of each return stroke of the work. The movement of each cutter to and from cutting position is achieved by reciprocation of the associated slide 222 (Fig. 20) through operation of associated barrel cam 223 which is driven in time with the shaft 380, to which crank plates 374 and 375 (Fig. 29) are secured; and in time with the rotation of the shaft, to which crank plate 391 is secured, by gearing 242, 243, 240 (Fig. 22), 245 (Fig. 20), 246, 252, 255.

The inertia of the clapping slides is compensated for by inertia member 260 which is driven from gear 240 by the varying ratio gearing 262, 261.

During the withdrawal movement of each cutter, the cutter is honed, the chip removing and the honing tools 163, 165 (Figs. 15 to 18) being moved into and out of operative position by cam 343 (Fig. 32) which is driven by gearing 345, 293 (Figs. 32 and 20), gear 293 being secured to shaft 256 which carries barrel cam 223.

After the work has been indexed through a revolution, each cutter may be indexed to bring another tooth of the cutter into cutting position so that the tooth spaces of the blank may be cut deeper, and finally finished. Indexing of each cutter is effected by lifting associated continuously rotating plate 272 (Figs. 20, 23 and 24) into position where the cam portion of this plate can engage the tail 274 of associated locking pawl 271 to disengage the pawl from associated index plate 210, and where associated pin 216 can then engage and actuate associated Geneva wheel 273. Each shaft 215, to which each plate 272 is secured, is lifted by a forked lever 303 (Fig. 27) by operation of spring 305 when the associated locking dog 306 is disengaged by operation of associated solenoid 310. The solenoids associated with the several cutters are actuated by switches 317, 317′, 317″ controlled by cam 321 (Fig. 20) which is secured to shaft 324 that is driven by gearing 325, 326, 332, 333 (Fig. 22), 243, 242.

Each plate 272 (Fig. 20) is driven continuously by gearing 293, 288 (Fig. 20) which drives the corresponding shaft 215. Each Geneva wheel 273 is geared to each cutter by gearing 275, 211 (Figs. 24 and 25), to index the associated cutter when the associated Geneva wheel is rotated.

For ease-off, each cutter is turned back and forth slightly during the cutting stroke of the work by eccentric movement of shaft 270 (Figs. 23 and 26) slightly by operation of cam 287 (Fig. 26), lever 290, and eccentric 285, in which shaft 270 is mounted. The eccentric movement of shaft 270 causes locking dog 271 (Fig. 23) to move index plate 210 and with it the associated cutter.

Shaft 380 (Fig. 29) is driven from shaft 471 (Fig. 34) through gearing 474, 383. The shaft, which carries crank plate 393 (Fig. 29), is geared at a one-to-one ratio to shaft 380. Shaft 471 (Fig. 34) also drives pinion 242 (Fig. 22) through gears 476 (Fig. 34), and shafts 475, 477. Pinion 242 is keyed to shaft 477 and drives the clapping motion cam 223 (Fig. 20) and the cam 321 (Fig. 27) controlling cutter indexing as already described. Inertia in the work indexing and rotating parts is taken up by inertia member 410 (Fig. 29) which is driven by varying ratio gearing 413, 411 from shaft 380.

*Other embodiments*

In a further embodiment intended especially for the use of carbide-tipped cutters I may provide a different cutter index drive, that permits starting the indexing motion before the clapping motion is completed. Thus I may use a spur pinion whose axis extends in the direction of the clapping motion and of axis 225 (Fig. 21), meshing with a tapered face gear that is rigidly secured to the index plate 210 (Fig. 20).

The said tapered face gear then replaces gear 211 (Figs. 24 and 25); and the said spur pinion replaces pinion 275. The pinion is rotatably mounted on slide 217 (Figs. 20, 21); and its mesh is entirely unaffected by the clapping motion, as this motion is lengthwise of its teeth. The clapping motion of the cutters away from cutting position can then continue to near the middle of the return stroke of the work piece, after cutter indexing may already have started. Moreover, the motion of slide 217 returning the cutter toward its cutting position may start near the middle of the return stroke of the work, so that the cutter stays only an instant in its outmost clapping position.

The distance travelled in the clapping motion is much larger than the tooth depth, say twice as large, so that the cutter gets clear of the outside surface of the work piece at top speed, and slows down only afterwards. In this way the inertia loads can be reduced by spreading the accelerations over a larger part of the cycle.

The method and cutters of the present invention may be used on multi-station machines, such as turret type machines, or on machines arranged in line and having a known transport mechanism between the stations. For such cases, an adaptation may be made, when the stations are to be used one after the other, so that a work piece goes from station to station. In this case, the cutters of any one station do not have to have all the different cutting teeth of, for instance, the cutter 57 of Fig. 3, or the cutters 67, 100 of Figs. 5 and 9. While cutters, such as the cutter 57, have roughing teeth 60a, 60b, 60c, etc., all of different height, and different widths at their outside ends, these different cutting teeth may be provided on cutters at different stations.

A preferred arrangement comprises the use of different cutters at different stations for a given workpiece. The several cutters at any one station, however, are preferably identical. Moreover, each cutter has identical cutting teeth equally spaced about its axis and covering its full circumference. Out of the many different roughing teeth of a cutter 57 only a fraction are used, which are evenly spaced from one another. Thus, the cutters of the first station may have cutting teeth like, for instance, the fifth cutting tooth of cutter 57, that is, equal to the cutting tooth 60e. The cutters of the second station then may have cutting teeth like the tenth cutting tooth of cutter 57, that is, equal to its cutting tooth 60k; etc.

The cutters of each station are fed depthwise through the difference in height between the cutting teeth of adjacent stations. When final position of this limited depth feed is reached, a workpiece is transferred to the next station.

In the first station, then, the work is cut to a fraction of the final tooth depth. In the second station it is cut deeper; for instance, double that depth. This goes on at station after station until full depth is reached.

In the roughing operation, the cutters are preferably indexed after each cutting stroke. This does not affect the shape produced, since all cutting teeth of a cutter are alike in this embodiment of the invention. It does distribute the heat produced. In this way, it is possible to increase either the feed rate, or the cutting speed, or both, and obtain a marked increase in output.

The workpiece may also be indexed after each cutting stroke, or else it is indexed after completion of the short feed cycle on a tooth space.

From the foregoing it will be seen that at most of the roughing stations gear cutters are used having cutting teeth whose depth is smaller than half the pitch of the cutting teeth at their root circle, that is, less than half the distance between adjacent cutting teeth. Also, on some of the cutters, the width at the top of a cutting tooth is larger than its depth, as will be seen from Fig. 3.

In the finishing operation by form cutting it is preferred also on multi-station machines to finish each of the two sides of all the teeth with the same cutting edge.

While the invention has been described, then, in connection with several different embodiments thereof, it will be understood that it is capable of various further modifications, and uses, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. The method of cutting helical teeth on a blank, which comprises engaging with the blank a rotatable cutter, that has a plurality of cutting teeth of progressively increasing depth spaced about its axis of rotation and that extend parallel to said axis, cutting predominantly with the tops of said cutting teeth by providing a width of said cutting teeth at their tops decreasing with increasing depth, and cutting with one tooth of the cutter at a time by effecting cutting strokes between the cutter and blank which comprise rectilinear movement in the direction of the axis of the blank and simultaneous angular movement about the blank axis, the cutter axis being inclined to the rectilinear component of the cutting strokes to effect cutting clearance, turning the blank on its axis between each successive cutting stroke so that different tooth spaces of the blank are engaged by the cutter on successive cutting strokes, and periodically indexing the cutter on its axis to bring its different cutting teeth successively into cutting engagement with the blank.

2. The method of cutting teeth on a blank, which comprises engaging with the blank a rotatable cutter having a plurality of cutting teeth spaced about its axis and extending parallel thereto, said cutter having a group of cutting teeth of progressively increasing depth and of a width at their tops which decreases with increasing depth to cut predominantly with their tops, followed by cutting teeth which have side cutting edges extending for the full working depth of the teeth to be cut in the blank, positioning said cutter relative to the blank so that its axis is inclined for cutting clearance and so as to cut first with that tooth of the first-named group of its teeth which has the widest top, effecting cutting strokes between the tool and blank in the direction of the teeth to be cut on the blank to cut with one cutting tooth at a time, indexing the blank between each successive cutting stroke, and periodically indexing said cutter to bring its cutting teeth successively into cutting engagement with the blank.

3. The method of cutting teeth on a blank, which comprises engaging with the blank a rotatable cutter having a plurality of cutting teeth spaced about its axis, said cutter having a group of cutting teeth of progressively increasing depth and of a width at their tops which increases with decreasing depth to cut principally with their tops, followed by a plurality of cutting teeth which have concavely curved side cutting edges extending for the full working depth of the teeth to be cut in the blank, positioning said cutter relative to the blank so as to cut first with that tooth of the first-named group of its teeth which has the widest top, effecting cutting strokes between the tool and blank in the direction of the teeth to be cut on the blank to cut with one cutting tooth at a time, indexing the blank between each successive cutting stroke, and periodically indexing said cutter to bring its cutting teeth successively into cutting engagement with the blank, and slowing down the cutting strokes toward the end of the cutting operation to obtain a good finish.

4. The method of cutting teeth on a rotary blank, which comprises positioning in operative relation with the blank a plurality of rotatable cutters, each having a plurality of cutting teeth disposed about its axis, said cutting teeth having progressively increasing depth and a width at their tops which decreases with increasing depth to cut principally with their tops, and effecting cutting strokes between the cutters and blank in the direction of the axis of the blank to cut simultaneously with said cutters at different distances, respectively, from the axis of the blank, indexing the blank between successive cutting strokes, and periodically indexing the cutters to bring their different cutting teeth successively into cutting engagement with the blank.

5. The method of cutting teeth on a rotary blank, which comprises positioning in operative relation with the blank a plurality of rotatable cutters, each having a plurality of cutting teeth disposed about its axis, each cutter having cutting teeth of progressively increasing depth and a width at their tops which decreases with increasing depth, the initial teeth of the different cutters also having, respectively, progressively different depths and widths at their tops decreasing with increasing depth, the depths of successive teeth of all the cutters increasing progressively by the approximately same increments, and said cutters being disposed at approximately equal distances about the axis of the blank, effecting cutting strokes between the cutters and blank in the direction of the axis of the blank, indexing the blank between successive cutting strokes, and indexing each of the cutters successively to bring different cutting teeth of the different cutters successively into cutting engagement with the blank to make progressively deeper cuts in the blank on successive cutting strokes.

6. The method of cutting teeth on a blank, which comprises engaging with the blank a rotatable cutter, that has a plurality of cutting teeth of progressively increasing depth arranged about its axis of rotation, cutting predominantly with the tops of said cutting teeth by providing said cutting teeth at their tops with a width decreasing with increasing depth of the teeth, effecting cutter strokes between the cutter and blank in the direction cutting strokes between the cutter and blank in the direction of the teeth to be cut on the blank to cut with one cutting tooth at a time while other cutting teeth of the cutter extend into tooth spaces of the blank but are out of cutting contact therewith, periodically indexing the blank to bring different tooth spaces of the blank into position to be cut on successive cutting strokes, and periodically indexing the cutter to bring its different cutting teeth successively into cutting position.

7. The method of cutting teeth on a blank, which comprises positioning in operative relation with the blank a plurality of rotatable cutters, each of which has a plurality of cutting teeth disposed about its axis, the outer ends of said cutting teeth of each cutter being arranged in a spiral about its axis and the width of said outer ends decreasing with increasing distance from the cutter axis to cut predominantly with said outer ends, and said cutters having slightly different widths at the outer ends of their teeth and being disposed at approximately equal distances from the axis of the blank, effecting cutting strokes between the blank and cutters in the direction of the teeth of the blank, and periodically indexing each of said cutters to bring their different cutting teeth successively into cutting engagement with the blank, said cutters being indexed one at a time, and each cutter being indexed between successive indexing movements of the other cutters.

8. The method of cutting teeth on a blank, which comprises positioning in operative relation with the blank a plurality of rotatable cutters, each of which has a plurality of cutting teeth disposed about its axis, some of the cutting teeth of each cutter having progressively increasing depth and a width at their tops which decreases with increasing depth, said cutting teeth being followed on two of the cutters by a plurality of teeth which are of a depth approximately equal to the depth of the deepest of the first-named cutting teeth and which have form-cutting side edges which are complementary in shape to the side profiles of the teeth to be cut on the blank and which extend for approximately the full depth of said cutting teeth, said cutters being disposed in spaced relation about the axis of the blank and so that the cutting tooth of each cutter which is of least depth cuts into the blank first, effecting cutting strokes between the blank and said cutters in the direction of the teeth of the blank, periodically indexing the cutters to bring their different cutting teeth successively into cutting engagement with the blank, and slightly turning each of said two cutters in opposite directions on its axis during cutting with said form-cutting teeth, at least, to effect ease-off at the ends of the teeth of the blank.

9. The method of cutting helical teeth on a blank, which comprises positioning a rotatable cutter, that has a plurality of longitudinally straight cutting teeth which extend parallel to its axis and which have concavely curved form-cutting side edges, in engagement with the blank with the axis of the cutter inclined to the axis of the blank to provide cutting clearance and with the cutter adjusted angularly about an axis radial of the blank in accordance with the helix angle of the teeth to be cut on the blank, effecting cutting strokes between the cutter and blank along and about the blank axis to cut with one cutting tooth at a time operating in a tooth space of the blank but with other cutting teeth of the cutter extending into other tooth spaces of the blank but out of cutting contact therewith, indexing the blank between successive cutting strokes so that the cutter cuts in different tooth spaces of the blank on successive cutting strokes, and periodically indexing said cutter.

10. The method of cutting a blank, which comprises effecting cutting strokes between a cutting tooth and the blank, indexing the blank after each cutting stroke so that a different tooth space of the blank is cut on each successive cutting stroke, bringing a different cutting tooth into engagement with the blank after the blank has been indexed for its total number of tooth spaces, the different cutting tooth being of greater depth but of less top width than the first cutting tooth so that it cuts principally with its top, and repeating the cutting strokes and indexing operations until the second cutting tooth has taken cuts in all the tooth spaces of the blank, and bringing other cutting teeth, which have progressively increasing depths and progressively decreasing top widths progressively into engagement with the blank after a cut has been taken by a preceding cutting tooth in all the tooth spaces of the blank, and repeating the cutting strokes and indexing operations for each such other cutting tooth until the tooth spaces of the blank have all been cut for their full depths, and then effecting full-depth cuts in the tooth spaces of the blank by bringing still other cutting teeth into engagement with the blank which have side finish-cutting edges complementary to the side tooth profiles of the teeth of the blank to finish opposite sides of the tooth spaces of the blank, and repeating the cutting strokes and indexing operations until all of the sides of the teeth of the blank have been finish-cut.

11. The method of cutting gear teeth in a cylindrical blank which comprises mounting a plurality of rotatable cutters adjacent to and on different sides of a gear blank, each of said cutters having a plurality of cutting teeth spaced about its axis at a distance from one another so that only one cutting tooth cuts in a tooth space of the blank at a time while adjacent cutting teeth extend into other tooth spaces of the blank without cutting, reciprocating the blank to effect cutting strokes, indexing the blank between successive cutting strokes to cut in different tooth spaces of the blank on successive cutting strokes, withdrawing said cutters from and advancing said cutters toward said blank, respectively, at the end and start, respectively, of each cutting stroke to cause the cutters to clear the blank completely on their return strokes, and gradually advancing the outer ends of the cutting teeth of the cutters together with the cutters themselves toward the bottoms of the tooth spaces of the blank.

12. The method of cutting gear teeth on cylindrical blanks which comprises mounting a plurality of cutting tools, comprising roughing tools and finishing tools, in operative relation with a gear blank, so that the tools are angularly spaced about the axis of the blank, effecting cutting strokes between the tools and blank in the direction of the teeth to be cut on the blank, withdrawing said cutters from and advancing said cutters toward said blank, respectively, at the end and start, respectively, of each cutting stroke to cause the cutters to clear the blank completely on their return strokes while maintaining approximate mass balance, indexing the blank between successive cutting strokes so that the tools enter different tooth spaces of the blank on successive cutting strokes, and finish-cutting one side of all the teeth of the blank with one of said tools, and finish-cutting the opposite side of all of the teeth of the blank with another of said tools, said tools having concavely curved side cutting edges complementary to the sides of teeth of the blank to be finish-cut thereby, whereby to form-cut said opposite sides of the teeth of the blank.

13. A machine for cutting teeth, comprising a rotatable work support, means for reciprocating said work support along its axis to effect cutting and return strokes thereof, a plurality of rotatable tool supports disposed around said work support at approximately the same distance therefrom, means for turning said work support on its axis on the return strokes, means for indexing said tool supports intermittently in succession, so that each tool support is indexed while the other tool supports are angularly stationary.

14. A machine for cutting teeth, comprising a rotatable work support, means for reciprocating said work support along its axis to effect cutting and return strokes thereof, a plurality of rotatable tool supports disposed around said work support at approximately the same distance therefrom, means for turning said work support on its axis on the return strokes, means for indexing said tool supports intermittently in succession, said last-named means comprising an indexing mechanism for each tool support, a rotary cam having a single control projection thereon, means for driving said cam in time with said work support, and abutment means associated with each tool support positioned to be engaged by said control projection as said cam rotates, for actuating the indexing mechanism of the associated tool support when said control projection engages its abutment means.

15. A machine for cutting teeth comprising a rotatable work support, a plurality of rotatable tool supports disposed about the axis of the work support, means for effecting reciprocating movements between said work support and said tool supports, to effect cutting and return strokes, means for bodily moving said tool supports from and to the axis of said work support in different directions, respectively, to keep the tools completely clear of the workpiece during the return strokes while maintaining approximate mass balance, means for turning the work support on its axis on the return strokes so that the work is indexed between cutting strokes, and means for periodically indexing the tool supports rotatably.

16. A machine for cutting teeth comprising a rotatable work support, means for reciprocating said work support to effect cutting and return strokes, a plurality of rotatable tool supports disposed about the axis of said work support, a tool secured on each tool support, a slide on which each of said tool supports is mounted, means for moving each slide in opposite directions radially of the axis of the work support at opposite ends of the cutting strokes to move the tools to and from cutting position, means for turning the work support on the return strokes, and means for periodically indexing the tool supports rotatably.

17. A machine for cutting teeth, comprising a rotatable work support, a rotatable tool support having an axis inclined to the axis of said work support to effect cutting clearance by the position of said axis, means for reciprocating one of said supports relatively to the other to effect cutting and return strokes while maintaining said tool support against rotation on its axis, clapping means for moving the tool to and from cutting position at opposite ends of said strokes, means for turning the work support on its axis on the return strokes so that the work is indexed between cutting strokes, and means for periodically indexing the tool support.

18. A machine for cutting helical teeth, comprising a rotatable work support, a rotatable tool support having an axis inclined to the axis of said work support, means for tilting said tool support about an axis approximately radial of said work support and inclined at an acute angle to the axis of said tool support, means for effecting helical reciprocation of said work support along and about its axis to effect cutting and return strokes while maintaining said tool support against rotation on its axis, clapping means for moving the tool to and from cutting position at opposite ends of said strokes, means for turning the work support on its axis on the return strokes so that the work is indexed between cutting strokes, and means for indexing the tool support periodically.

19. In a machine for cutting helical teeth, a rotatable work support, a tool support adapted to mount a form-cutting tool with a straight cutting tooth of uniform cross-section to extend in a direction askew to the axis of said work support, means for effecting helical reciprocation of said work support along and about its axis to effect cutting and return strokes while maintaining said tool support against rotation on its axis, clapping means for moving the tool to and from cutting position at opposite ends of said strokes, and means for moving said tool in opposite directions radially of the axis of said work support at opposite ends of the cutting strokes.

20. A machine for cutting teeth, comprising a rotatable work support, means for reciprocating said work support to effect cutting and return strokes, a plurality of rotatable tool supports disposed about the axis of said work support, means for tilting each tool support about an axis approximately radial of said work support, means for displacing each tool support radially upon completion of each combined cutting and return stroke so that approximate mass balance is achieved through the different directions of said displacements, means for indexing said work support, and means for periodically indexing each of said tool supports.

21. The method of cutting helical teeth on a blank, which comprises positioning in operative relation with a blank a plurality of tools spaced about the axis of the blank, each of said tools having a straight cutting tooth inclined to axial planes of said blank and being of concavely curved profile, reciprocating the blank helically along and about its axis to effect cutting and return strokes, while holding said tools stationary on their axes, moving said tools in different and approximately radial directions to and from cutting position at opposite ends of each cutting stroke whereby approximate mass balance is attained, and cutting progressively deeper until full cutting depth is reached.

References Cited in the file of this patent

UNITED STATES PATENTS

| | | |
|---|---|---|
| 401,987 | Waterman | Apr. 23, 1889 |
| 1,079,420 | Mackay | Nov. 25, 1913 |
| 1,280,892 | Steenstrup | Oct. 8, 1918 |
| 1,953,969 | Miller | Apr. 10, 1934 |
| 2,024,380 | Miller | Dec. 17, 1935 |
| 2,029,399 | Try | Feb. 4, 1936 |
| 2,198,882 | Monroe | Apr. 30, 1940 |
| 2,282,193 | Lambrix | May 5, 1942 |
| 2,327,296 | Wildhaber | Aug. 17, 1943 |
| 2,352,557 | Miller | June 27, 1944 |
| 2,385,331 | Carlsen | Sept. 25, 1945 |
| 2,410,913 | Wildhaber | Nov. 12, 1946 |
| 2,506,082 | Hartman | May 2, 1950 |
| 2,660,929 | Praeg | Dec. 1, 1953 |
| 2,664,030 | Trace | Dec. 29, 1953 |